United States Patent
Grimm et al.

(10) Patent No.: US 12,533,171 B2
(45) Date of Patent: Jan. 27, 2026

(54) CHUCK SYSTEM FOR A POWERED SURGICAL IMPACTOR

(71) Applicant: Zimmer, Inc., Warsaw, IN (US)

(72) Inventors: James Grimm, Winona Lake, IN (US); Alexander Slocum, Bow, NH (US); Canan Ciesielski, Warsaw, IN (US); Salvador Torres, Valencia (ES); Pedro Luis Moreno Delgado, Logrono (ES); Jaime Rodenas, Cartagena (ES)

(73) Assignee: Zimmer, Inc., Warsaw, IN (US)

( * ) Notice: Subject to any disclaimer, the term of this patent is extended or adjusted under 35 U.S.C. 154(b) by 66 days.

(21) Appl. No.: 18/593,177

(22) Filed: Mar. 1, 2024

(65) Prior Publication Data

US 2024/0299072 A1    Sep. 12, 2024

Related U.S. Application Data

(60) Provisional application No. 63/450,311, filed on Mar. 6, 2023.

(51) Int. Cl.
*A61B 17/92* (2006.01)
*A61B 17/00* (2006.01)

(52) U.S. Cl.
CPC .... *A61B 17/92* (2013.01); *A61B 2017/00473* (2013.01)

(58) Field of Classification Search
CPC ..... A61B 17/92; A61B 17/162; B23B 31/123; B23B 31/1071; B25B 23/0035
See application file for complete search history.

(56) References Cited

U.S. PATENT DOCUMENTS

| 974,267 A | 11/1910 | Hennessy et al. |
| 2,270,929 A | 1/1942 | Bugg |
| 2,323,375 A | 7/1943 | Bugg |

(Continued)

FOREIGN PATENT DOCUMENTS

| AU | 2019203142 A1 | 11/2019 |
| AU | 2020200771 A1 | 2/2020 |

(Continued)

OTHER PUBLICATIONS

"U.S. Appl. No. 17/523,540, Notice of Allowance mailed Apr. 22, 2024", 10 pgs.

(Continued)

*Primary Examiner* — Andrew Yang
(74) *Attorney, Agent, or Firm* — SCHWEGMAN LUNDBERG & WOESSNER, P.A.

(57) ABSTRACT

A chuck for a powered surgical impactor can include a first body insertable into the powered surgical impactor and defining a first bit bore, a second body adapted to receive the first body; and a third body receivable at least partially within the second body and defining a second bit bore. The third body can define a lock projection extending radially inward into the second bit bore; and the third body and the second body can be adapted to rotate relative to the first body to move the lock projection between an unlocked position, in which the lock projection is located to allow insertion of a surgical instrument into the chuck, and an unlocked position, in which the lock projection is located to prevent removal of the surgical instrument from the chuck.

20 Claims, 13 Drawing Sheets

(56) References Cited

U.S. PATENT DOCUMENTS

| | | |
|---|---|---|
| 2,353,321 A | 7/1944 | Snodgrass |
| 2,542,695 A | 2/1951 | Neff et al. |
| 2,576,851 A | 11/1951 | Newman |
| 2,655,921 A | 10/1953 | Haboush |
| 2,657,383 A | 11/1953 | Siering et al. |
| 3,450,215 A | 6/1969 | Emery |
| 3,472,323 A | 10/1969 | Hall |
| 3,626,935 A | 12/1971 | Pollock et al. |
| 3,737,170 A * | 6/1973 | Wanner .......... B23B 31/1253 279/140 |
| 3,752,161 A | 8/1973 | Bent |
| 3,829,974 A | 8/1974 | Mc Shirley |
| 4,298,074 A | 11/1981 | Mattchen |
| 4,466,429 A | 8/1984 | Loscher et al. |
| 4,651,833 A | 3/1987 | Karpf et al. |
| 4,834,092 A | 5/1989 | Alexson et al. |
| 5,057,112 A | 10/1991 | Sherman et al. |
| 5,108,400 A | 4/1992 | Appel et al. |
| 5,152,352 A | 10/1992 | Mandanis |
| 5,163,519 A | 11/1992 | Mead et al. |
| 5,210,918 A | 5/1993 | Wozniak et al. |
| 5,282,805 A | 2/1994 | Richelsoph et al. |
| 5,352,230 A | 10/1994 | Hood |
| 5,353,230 A | 10/1994 | Maejima et al. |
| 5,363,726 A | 11/1994 | Smith |
| 5,431,660 A | 7/1995 | Burke |
| 5,485,887 A | 1/1996 | Mandanis |
| 5,553,675 A | 9/1996 | Pitzen et al. |
| 5,868,756 A | 2/1999 | Henry et al. |
| 6,126,694 A | 10/2000 | Gray, Jr. |
| 6,159,214 A | 12/2000 | Michelson |
| 6,264,660 B1 | 7/2001 | Schmidt et al. |
| 6,264,661 B1 | 7/2001 | Jerger et al. |
| 6,368,324 B1 | 4/2002 | Dinger |
| 6,520,266 B2 | 2/2003 | Bongers-ambrosius et al. |
| 6,626,913 B1 | 9/2003 | Mckinnon et al. |
| 6,814,738 B2 | 11/2004 | Naughton et al. |
| 6,868,918 B2 | 3/2005 | Shinohara |
| 7,090,677 B2 | 8/2006 | Fallin et al. |
| 7,189,241 B2 | 3/2007 | Yoon et al. |
| 7,637,327 B2 | 12/2009 | Gruenig |
| 7,874,839 B2 | 1/2011 | Bouneff |
| 8,002,776 B2 | 8/2011 | Liu et al. |
| 8,393,409 B2 | 3/2013 | Pedicini |
| 8,444,647 B2 | 5/2013 | Walen et al. |
| 8,465,492 B2 | 6/2013 | Estes |
| 8,556,901 B2 | 10/2013 | Anthony et al. |
| 8,602,124 B2 | 12/2013 | Pedicini |
| 8,695,726 B2 | 4/2014 | Pedicini |
| 8,894,654 B2 | 11/2014 | Anderson |
| 8,936,105 B2 | 1/2015 | Pedicini |
| 8,936,106 B2 | 1/2015 | Pedicini |
| 9,168,154 B2 | 10/2015 | Behzadi |
| 9,186,158 B2 | 11/2015 | Anthony et al. |
| 9,198,675 B2 | 12/2015 | Nelson et al. |
| 9,220,612 B2 | 12/2015 | Behzadi |
| 9,554,965 B2 | 1/2017 | Foehrenbach |
| 9,629,641 B2 | 4/2017 | Ferro et al. |
| 9,649,202 B2 | 5/2017 | Behzadi et al. |
| 9,877,734 B2 | 1/2018 | Anderson |
| 9,901,354 B2 | 2/2018 | Pedicini |
| 9,931,151 B2 | 4/2018 | Donald et al. |
| 9,943,318 B2 | 4/2018 | Anthony et al. |
| RE46,954 E | 7/2018 | Pedicini |
| 10,028,754 B2 | 7/2018 | Johnson et al. |
| RE46,979 E | 8/2018 | Pedicini |
| 10,159,500 B2 | 12/2018 | Chavarria et al. |
| 10,172,722 B2 | 1/2019 | Behzadi et al. |
| 10,245,160 B2 | 4/2019 | Behzadi |
| 10,245,162 B2 | 4/2019 | Behzadi et al. |
| 10,251,663 B2 | 4/2019 | Behzadi |
| 10,299,930 B2 | 5/2019 | Behzadi |
| 10,342,591 B2 | 7/2019 | Pedicini |
| 10,368,882 B2 | 8/2019 | Ferro et al. |
| 10,413,425 B2 | 9/2019 | Behzadi et al. |
| 10,426,540 B2 | 10/2019 | Behzadi |
| 10,441,244 B2 | 10/2019 | Behzadi |
| 10,456,271 B2 | 10/2019 | Behzadi |
| 10,463,505 B2 | 11/2019 | Behzadi |
| 10,470,897 B2 | 11/2019 | Behzadi |
| 10,478,318 B2 | 11/2019 | Behzadi et al. |
| 10,568,643 B2 | 2/2020 | Johnson et al. |
| 10,603,173 B2 | 3/2020 | Carr et al. |
| RE47,963 E | 4/2020 | Pedicini |
| 10,610,379 B2 | 4/2020 | Behzadi |
| RE47,997 E | 5/2020 | Pedicini |
| 10,653,533 B2 | 5/2020 | Behzadi et al. |
| 10,660,767 B2 | 5/2020 | Behzadi |
| 10,729,559 B2 | 8/2020 | Behzadi et al. |
| RE48,184 E | 9/2020 | Pedicini |
| RE48,251 E | 10/2020 | Pedicini |
| 11,013,503 B2 | 5/2021 | Pedicini |
| 11,490,943 B2 | 11/2022 | Haiat et al. |
| 11,918,268 B2 | 3/2024 | Doyle |
| 11,925,359 B2 | 3/2024 | Slocum et al. |
| 12,004,793 B2 | 6/2024 | Levy |
| 12,064,158 B2 | 8/2024 | Marinkovich |
| 12,070,256 B2 | 8/2024 | Slocum et al. |
| 12,251,148 B2 | 3/2025 | Slocum |
| 2004/0026097 A1 | 2/2004 | Hecht |
| 2006/0134957 A1* | 6/2006 | Cornwell .......... B23B 31/1071 439/190 |
| 2007/0282345 A1 | 12/2007 | Yedlicka et al. |
| 2009/0026718 A1* | 1/2009 | Krondorfer ........ B23B 31/2012 279/75 |
| 2010/0137760 A1 | 6/2010 | Schulz et al. |
| 2011/0245833 A1 | 10/2011 | Anderson |
| 2011/0255927 A1 | 10/2011 | Boudreau et al. |
| 2011/0270256 A1 | 11/2011 | Nelson et al. |
| 2012/0172939 A1 | 7/2012 | Pedicini |
| 2012/0215267 A1 | 8/2012 | Pedicini |
| 2012/0259339 A1 | 10/2012 | Hood et al. |
| 2013/0161050 A1 | 6/2013 | Pedicini |
| 2013/0261681 A1 | 10/2013 | Bittenson |
| 2014/0318819 A1 | 10/2014 | Pedicini |
| 2014/0318823 A1 | 10/2014 | Pedicini |
| 2015/0196343 A1 | 7/2015 | Donald et al. |
| 2016/0199199 A1 | 7/2016 | Pedicini |
| 2017/0020536 A1 | 1/2017 | Johnson et al. |
| 2017/0056205 A1 | 3/2017 | Biegun et al. |
| 2018/0001447 A1 | 1/2018 | Lam et al. |
| 2018/0055518 A1 | 3/2018 | Pedicini |
| 2018/0055552 A1 | 3/2018 | Pedicini |
| 2018/0303496 A1 | 10/2018 | Johnson et al. |
| 2018/0318089 A1 | 11/2018 | Carr et al. |
| 2018/0338751 A1 | 11/2018 | Pedicini |
| 2018/0360464 A1 | 12/2018 | Irvine |
| 2019/0070719 A1 | 3/2019 | Liang et al. |
| 2019/0167434 A1 | 6/2019 | Satterthwaite et al. |
| 2019/0183554 A1 | 6/2019 | Pedicini |
| 2019/0216521 A1 | 7/2019 | Chhatrala |
| 2019/0247057 A1 | 8/2019 | Anderson |
| 2019/0282286 A1 | 9/2019 | Pedicini |
| 2019/0350725 A1 | 11/2019 | Behzadi |
| 2020/0060693 A1 | 2/2020 | Sweitzer |
| 2020/0178998 A1 | 6/2020 | Behzadi |
| 2021/0322081 A1* | 10/2021 | Sweitzer .............. A61F 2/4603 |
| 2022/0142693 A1 | 5/2022 | Slocum et al. |
| 2022/0226033 A1 | 7/2022 | Slocum et al. |
| 2022/0240946 A1 | 8/2022 | Slocum et al. |
| 2022/0240947 A1 | 8/2022 | Marinkovich |
| 2022/0240998 A1 | 8/2022 | Slocum |
| 2022/0273317 A1 | 9/2022 | Levy |
| 2022/0323134 A1 | 10/2022 | Lyon et al. |
| 2022/0361934 A1 | 11/2022 | Pedicini |
| 2023/0240735 A1 | 8/2023 | Doyle |
| 2023/0285062 A1 | 9/2023 | Santos et al. |
| 2024/0024012 A1 | 1/2024 | Dittrich et al. |

FOREIGN PATENT DOCUMENTS

| | | |
|---|---|---|
| AU | 2021239844 A1 | 10/2022 |
| AU | 2017320580 B2 | 4/2023 |
| AU | 2021378282 A1 | 6/2023 |

(56) References Cited

FOREIGN PATENT DOCUMENTS

| | | | |
|---|---|---|---|
| AU | 2022227599 A1 | 8/2023 |
| AU | 2021378282 B2 | 10/2024 |
| AU | 2022212126 B2 | 11/2024 |
| AU | 2022212275 B2 | 11/2024 |
| AU | 2022214931 B2 | 11/2024 |
| AU | 2023206091 B2 | 11/2024 |
| AU | 2022211325 B2 | 12/2024 |
| AU | 2024201431 B2 | 5/2025 |
| CA | 3063569 A1 | 11/2018 |
| CA | 3209081 A1 | 8/2022 |
| CA | 3211071 A1 | 9/2022 |
| CH | 701397 A2 | 1/2011 |
| CN | 2423872 Y | 3/2001 |
| CN | 204863450 U | 12/2015 |
| CN | 109070324 A | 12/2018 |
| CN | 108602180 B | 12/2022 |
| CN | 116801840 A | 9/2023 |
| CN | 117414174 A | 1/2024 |
| DE | 102010017726 A1 | 1/2011 |
| EP | 0290375 A1 | 11/1988 |
| EP | 0745460 A1 | 12/1996 |
| EP | 4427685 A1 | 9/2024 |
| EP | 4243715 B1 | 4/2025 |
| FR | 2054809 A5 | 5/1971 |
| JP | S6018188 U | 2/1985 |
| JP | H06229427 A | 8/1994 |
| JP | H06304193 A | 11/1994 |
| JP | H10174689 A | 6/1998 |
| JP | 2002144255 A | 5/2002 |
| JP | 2004159741 A | 6/2004 |
| JP | 2005506211 A | 3/2005 |
| JP | 2006231511 A | 9/2006 |
| JP | 2010524577 A | 7/2010 |
| JP | 2012504987 A | 3/2012 |
| JP | 2013036488 A | 2/2013 |
| JP | 2015517341 A | 6/2015 |
| JP | 2016202560 A | 12/2016 |
| JP | 2017024167 A | 2/2017 |
| JP | 2018502689 A | 2/2018 |
| JP | 2019022663 A | 2/2019 |
| JP | 2019524165 A | 9/2019 |
| JP | 2019177138 A | 10/2019 |
| JP | 2019198645 A | 11/2019 |
| JP | 2020521560 A | 7/2020 |
| JP | 2020530332 A | 10/2020 |
| JP | 2020185421 A | 11/2020 |
| JP | 7127068 B2 | 8/2022 |
| JP | 2022166207 A | 11/2022 |
| JP | 7366968 B2 | 10/2023 |
| JP | 7375104 B2 | 10/2023 |
| JP | 7404463 B2 | 12/2023 |
| JP | 2023551117 A | 12/2023 |
| JP | 2024013234 A | 1/2024 |
| JP | 2024504977 A | 2/2024 |
| JP | 2024505231 A | 2/2024 |
| JP | 2024505239 A | 2/2024 |
| JP | 2024505543 A | 2/2024 |
| JP | 2024507954 A | 2/2024 |
| JP | 2024126020 A | 9/2024 |
| JP | 7571213 B2 | 10/2024 |
| JP | 7592184 B2 | 11/2024 |
| JP | 7599016 B2 | 12/2024 |
| JP | 7602052 B2 | 12/2024 |
| JP | 2024180472 A | 12/2024 |
| JP | 2025026539 A | 2/2025 |
| JP | 7676565 B2 | 5/2025 |
| JP | 7678117 B2 | 5/2025 |
| JP | 7680548 B2 | 5/2025 |
| WO | WO-8802246 A2 | 4/1988 |
| WO | WO-8906516 A1 | 7/1989 |
| WO | WO-2008130904 A2 | 10/2008 |
| WO | WO-2016112397 A1 | 7/2016 |
| WO | WO-2018044348 A1 | 3/2018 |
| WO | WO-2018217250 A1 | 11/2018 |
| WO | WO-2022103835 A1 | 5/2022 |
| WO | WO-2022159704 A1 | 7/2022 |
| WO | WO-2022165215 A1 | 8/2022 |
| WO | WO-2022165223 A1 | 8/2022 |
| WO | WO-2022165357 A1 | 8/2022 |
| WO | WO-2022182772 A1 | 9/2022 |

OTHER PUBLICATIONS

"Australian Application Serial No. 2021378282, Response filed May 22, 2024 to First Examination Report mailed Mar. 7, 2024", 8 pgs.

"Australian Application Serial No. 2022211325, First Examination Report mailed Apr. 29, 2024", 3 pgs.

"Australian Application Serial No. 2022211325, Response filed Jul. 19, 2024 to First Examination Report mailed Apr. 29, 2024", 17 pgs.

"Australian Application Serial No. 2022212126, First Examination Report mailed Apr. 26, 2024", 3 pgs.

"Australian Application Serial No. 2022212126, Response Filed Jul. 2, 2024 to First Examination Report mailed Apr. 26, 2024", 16 pgs.

"Australian Application Serial No. 2022212275, First Examination Report mailed May 15, 2024", 2 pgs.

"Australian Application Serial No. 2022212275, Response Filed Jun. 19, 2024 to First Examination Report mailed May 15, 2024", 14 pgs.

"Australian Application Serial No. 2022214931, First Examination Report mailed May 7, 2024", 3 pgs.

"Australian Application Serial No. 2022214931, Response filed Jul. 26, 2024 to First Examination Report mailed May 7, 2024", 9 pgs.

"Australian Application Serial No. 2022227599, First Examination Report mailed Apr. 18, 2024", 2 pgs.

"Australian Application Serial No. 2022227599, Response Filed Sep. 27, 20024 to First Examination Report mailed Apr. 18, 2024", 14 pgs.

"Australian Application Serial No. 2023206091, First Examination Report mailed Apr. 19, 2024", 4 pgs.

"Australian Application Serial No. 2023206091, Response filed Jul. 5, 2024 to First Examination Report mailed Apr. 19, 2024", 13 pgs.

"European Application Serial No. 22703776.9, Response Filed Mar. 11, 2024 to Communication pursuant to Rules 161(1) and 162 EPC mailed Aug. 30, 2023", 9 pgs.

"European Application Serial No. 22704684.4, Response filed Mar. 18, 2024 to Communication pursuant to Rules 161(1) and 162 EPC mailed Sep. 7, 2023", 17 pgs.

"European Application Serial No. 22705238.8, Response Filed Mar. 18, 2024 to Communication pursuant to Rules 161(1) and 162 EPC mailed Sep. 8, 2023", 172 pgs.

"European Application Serial No. 22705250.3, Response Filed Mar. 18, 2024 to Communication pursuant to Rules 161(1) and 162 EPC mailed Sep. 8, 2023", 15 pgs.

"European Application Serial No. 22713111.7, Response Filed Apr. 15, 2024 to Communication pursuant to Rules 161(1) and 162 EPC mailed Oct. 4, 2024", 8 pgs.

"European Application Serial No. 24161610.1, Extended European Search Report mailed Jul. 10, 2024", 6 pgs.

"Japanese Application Serial No. 2023-117628, Notification of Reasons for Refusal mailed May 28, 2024", w/ English translation, 7 pgs.

"Japanese Application Serial No. 2023-527766, Notification of Reasons for Refusal mailed Apr. 16, 2024", w/ English translation, 6 pgs.

"Japanese Application Serial No. 2023-544157, Notice of Reasons for Rejection mailed Apr. 23, 2024", w/ English translation, 5 pgs.

"Japanese Application Serial No. 2023-546065, Notification of Reasons for Refusal mailed Apr. 16, 2024", w/ English Translation, 15 pgs.

"Japanese Application Serial No. 2023-546135, Notification of Reasons for Refusal mailed Apr. 16, 2024", w/ English Translation, 9 pgs.

"Japanese Application Serial No. 2023-546333, Notification of Reasons for Refusal mailed Apr. 16, 2024", w/ English translation, 8 pgs.

(56) References Cited

OTHER PUBLICATIONS

"Japanese Application Serial No. 2023-552050, Notification of Reasons for Rejection mailed Jul. 2, 2024", W/English Translation, 5 pgs.

"U.S. Appl. No. 17/587,866, Notice of Allowance mailed Apr. 11, 2024", 17 pgs.

"Australian Application Serial No. 2021378282, First Examination Report mailed Mar. 7, 2024", 3 pgs.

U.S. Appl. No. 17/523,540, filed Nov. 10, 2021, Bi-Spring Surgical Impact Tool.

U.S. Appl. No. 17/581,316, filed Jan. 21, 2022, Linear Electric Surgical Hammer Impact Tool.

U.S. Appl. No. 17/587,794 U.S. Pat. No. 11,925,359, filed Jan. 28, 2022, Rotary Electric Surgical Hammer Impact Tool.

U.S. Appl. No. 17/587,866, filed Jan. 28, 2022, Orthopedic Impactor Tool.

U.S. Appl. No. 17/678,807, filed Feb. 23, 2022, Bi-Spring Surgical Hammer Impact Tools.

U.S. Appl. No. 17/589,456, filed Jan. 31, 2022, Tri-Roll Thread Electric Surgical Impact Tool.

U.S. Appl. No. 18/222,830, filed Jul. 17, 2023, Linear Electric Surgical Hammer Impact Tool.

"U.S. Appl. No. 17/587,794, Notice of Allowance mailed Nov. 15, 2023", 10 pgs.

"U.S. Appl. No. 17/587,794, Response filed Aug. 28, 2023 to Restriction Requirement mailed Jun. 27, 2023", 7 pgs.

"U.S. Appl. No. 17/587,794, Restriction Requirement mailed Jun. 27, 2023", 7 pgs.

"U.S. Appl. No. 17/678,807, Notice of Allowance mailed Feb. 14, 2024", 16 pgs.

"European Application Serial No. 21820393.3, Response Filed Dec. 14, 2023 to Communication pursuant to Rules 161(1) and 162 EPC mailed Jul. 6, 2023", 10 pgs.

"European Application Serial No. 23186404.2, Extended European Search Report mailed Nov. 23, 2023", 8 pgs.

"International Application Serial No. PCT/US2021/058776, International Preliminary Report on Patentability mailed May 25, 2023", 10 pgs.

"International Application Serial No. PCT/US2021/058776, International Search Report mailed Feb. 9, 2022", 5 pgs.

"International Application Serial No. PCT/US2021/058776, Written Opinion mailed Feb. 9, 2022", 8 pgs.

"International Application Serial No. PCT/US2022/013312, International Preliminary Report on Patentability mailed Aug. 3, 2023", 12 pgs.

"International Application Serial No. PCT/US2022/013312, International Search Report mailed Jun. 24, 2022", 6 pgs.

"International Application Serial No. PCT/US2022/013312, Invitation to Pay Additional Fees mailed May 3, 2022", 5 pgs.

"International Application Serial No. PCT/US2022/013312, Written Opinion mailed Jun. 24, 2022", 10 pgs.

"International Application Serial No. PCT/US2022/014368, International Preliminary Report on Patentability mailed Aug. 10, 2023", 10 pgs.

"International Application Serial No. PCT/US2022/014368, International Search Report mailed May 30, 2022", 7 pgs.

"International Application Serial No. PCT/US2022/014368, Invitation to Pay Additional Fees mailed Apr. 5, 2022", 10 pgs.

"International Application Serial No. PCT/US2022/014368, Written Opinion mailed May 30, 2022", 8 pgs.

"International Application Serial No. PCT/US2022/014380, International Preliminary Report on Patentability mailed Aug. 10, 2023", 9 pgs.

"International Application Serial No. PCT/US2022/014380, International Search Report mailed Jun. 24, 2022", 6 pgs.

"International Application Serial No. PCT/US2022/014380, Invitation to Pay Additional Fees mailed May 3, 2022", 5 pgs.

"International Application Serial No. PCT/US2022/014380, Written Opinion mailed Jun. 24, 2022", 7 pgs.

"International Application Serial No. PCT/US2022/014596, International Preliminary Report on Patentability mailed Aug. 10, 2023", 7 pgs.

"International Application Serial No. PCT/US2022/014596, International Search Report mailed May 10, 2022", 4 pgs.

"International Application Serial No. PCT/US2022/014596, Written Opinion mailed May 10, 2022", 5 pgs.

"International Application Serial No. PCT/US2022/017537, International Preliminary Report on Patentability mailed Sep. 7, 2023", 7 pgs.

"International Application Serial No. PCT/US2022/017537, International Search Report mailed Jun. 1, 2022", 4 pgs.

"International Application Serial No. PCT/US2022/017537, Written Opinion mailed Jun. 1, 2022", 5 pgs.

Budimir, Miles, "What is a rack and roller pinion?", [Online]. Retrieved from the Internet: <https://www.motioncontroltips.com/rack-roller-pinion/>, (Nov. 10, 2017), 13 pgs.

Nexen, "Rack and Roller Pinion System", [Online]. Retrieved from the Internet: <https://www.nexengroup.com/nxn/products/prod-nav/lp/Roller+Pinion+System>, (Accessed online Apr. 27, 2021), 10 pgs.

"U.S. Appl. No. 17/581,316, Final Office Action mailed Jul. 9, 2025", 10 pgs.

"U.S. Appl. No. 17/581,316, Non Final Office Action mailed Jan. 8, 2025", 8 pgs.

"U.S. Appl. No. 17/581,316, Response filed Apr. 8, 25 to Non Final Office Action mailed Jan. 8, 2025", 9 pgs.

"U.S. Appl. No. 17/581,316, Response filed Oct. 14, 24 to Restriction Requirement mailed Aug. 14, 2024", 7 pgs.

"U.S. Appl. No. 17/581,316, Restriction Requirement mailed Aug. 14, 2024", 5 pgs.

"U.S. Appl. No. 17/589,456, Corrected Notice of Allowability mailed Nov. 27, 2024", 2 pgs.

"U.S. Appl. No. 17/589,456, Ex Parte Quayle Action mailed Sep. 5, 2024", 10 pgs.

"U.S. Appl. No. 17/589,456, Notice of Allowance mailed Nov. 14, 2024", 7 pgs.

"U.S. Appl. No. 17/589,456, Response filed Oct. 28, 2024 to Ex Parte Quayle Action mailed Sep. 5, 2024", 11 pgs.

"U.S. Appl. No. 18/222,830, Notice of Allowance mailed Apr. 23, 2025", 11 pgs.

"Australian Application Serial No. 2024201431, First Examination Report mailed Oct. 29, 2024", 3 pgs.

"Australian Application Serial No. 2024201431, Response filed Jan. 9, 2025 to First Examination Report mailed Oct. 29, 2024", 16 pgs.

"Canadian Application Serial No. 3,200,838, Examiners Rule 86(2) Report mailed Aug. 21, 2024", 4 pgs.

"Canadian Application Serial No. 3,200,838, Response filed Dec. 10, 2024 to Examiners Rule 86(2) Report mailed Aug. 21, 2024", 22 pgs.

"Canadian Application Serial No. 3,206,984, Examiners Rule 86(2) Requisition mailed Nov. 21, 2024", 6 pgs.

"Canadian Application Serial No. 3,206,984, Response filed Mar. 17, 2025 to Examiners Rule 86(2) Requisition mailed Nov. 21, 2024", 15 pgs.

"Canadian Application Serial No. 3,206,985, Examiners Rule 86(2) Report mailed Nov. 21, 2024", 6 pgs.

"Canadian Application Serial No. 3,206,985, Response Filed Mar. 14, 25 to Examiners Rule 86(2) Report mailed Nov. 21, 2024", 16 pgs.

"Canadian Application Serial No. 3,207,039, Examiners Rule 86(2) Report mailed Nov. 22, 2024", 5 pgs.

"Canadian Application Serial No. 3,207,039, Response Filed Mar. 17, 2025 to Examiners Rule 86(2) Report mailed Nov. 22, 2024", 13 pgs.

"Canadian Application Serial No. 3,208,984, Examiners Rule 86(2) Report mailed Nov. 22, 2024", 5 pgs.

"Canadian Application Serial No. 3,208,984, Response filed Mar. 20, 2025 to Examiners Rule 86(2) Report mailed Nov. 22, 2024", 13 pgs.

"Canadian Application Serial No. 3,209,081, Examiners Rule 86(2) Report mailed Nov. 22, 2024", 4 pgs.

(56) References Cited

OTHER PUBLICATIONS

"Canadian Application Serial No. 3,209,081, Response filed Mar. 17, 2025 to Examiners Rule 86(2) Report mailed Nov. 22, 2024", 20 pgs.

"Canadian Application Serial No. 3,211,071, Office Action mailed Jan. 28, 2025", 6 pgs.

"Canadian Application Serial No. 3,211,071, Response filed May 22, 2025 to Office Action mailed Jan. 28, 2025", w/ English Claims, 9 pgs.

"European Application Serial No. 23186404.2, Response Filed Jul. 23, 2024 to Extended European Search Report mailed Nov. 23, 2023", 16 pgs.

"European Application Serial No. 24161610.1, Response filed Feb. 27, 2025 to Extended European Search Report mailed Jul. 10, 2024", 15 pgs.

"Japanese Application Serial No. 2023-117628, Response Filed Aug. 23, 2024 to Notification of Reasons for Refusal mailed May 28, 2024", W/ English Claims, 11 pgs.

"Japanese Application Serial No. 2023-527766, Notification of Reasons for Refusal mailed Jul. 30, 2024", w/ English Translation, 8 pgs.

"Japanese Application Serial No. 2023-527766, Response filed Oct. 29, 2024 to Notification of Reasons for Refusal mailed Jul. 30, 2024", W/ English Claims, 13 pgs.

"Japanese Application Serial No. 2023-527766, Response filed Jul. 11, 2024 to Notification of Reasons for Refusal mailed Apr. 16, 2024", W/ English Claims, 13 pgs.

"Japanese Application Serial No. 2023-544157, Response Filed Jul. 19, 2024 to Notice of Reasons for Rejection mailed Apr. 23, 2024", W/ English Claims, 13 pgs.

"Japanese Application Serial No. 2023-546065, Notification of Reasons for Rejection mailed Oct. 22, 2024", W/English Translation, 4 pgs.

"Japanese Application Serial No. 2023-546065, Response filed Jan. 20, 2025 to Notification of Reasons for Rejection mailed Oct. 22, 2024", W/ English Claims, 7 pgs.

"Japanese Application Serial No. 2023-546065, Response filed Jul. 12, 2024 to Notification of Reasons for Refusal mailed Apr. 16, 2024", W/ English Claims, 10 pgs.

"Japanese Application Serial No. 2023-546135, Final Notification of Reasons for Refusal mailed Oct. 22, 2024", w/ English translation, 5 pgs.

"Japanese Application Serial No. 2023-546135, Response filed Jan. 16, 2025 to Final Notification of Reasons for Refusal mailed Oct. 22, 2024", W/ English Claims, 7 pgs.

"Japanese Application Serial No. 2023-546135, Response filed Jul. 12, 2024 to Notification of Reasons for Refusal mailed Apr. 16, 2024", W/ English Claims, 10 pgs.

"Japanese Application Serial No. 2023-546333, Notification of Reasons for Rejection mailed Oct. 22, 2024", w/ English translation, 6 pgs.

"Japanese Application Serial No. 2023-546333, Response filed Jan. 20, 2025 to Notification of Reasons for Rejection mailed Oct. 22, 2024", W/ English Claims, 10 pgs.

"Japanese Application Serial No. 2023-546333, Response filed Jul. 12, 2024 to Notification of Reasons for Refusal mailed Apr. 16, 2024", W/ English Claims, 12 pgs.

"Japanese Application Serial No. 2023-552050, Resoponse Filed Sep. 24, 2024 to Notification of Reasons for Rejection mailed Jul. 2, 2024", W/ English Claims, 11 pgs.

"Japanese Application Serial No. 2024-033694, Notification of Reasons for Rejection mailed Feb. 4, 2025", W/English Translation, 12 pgs.

"Japanese Application Serial No. 2024-033694, Response Filed May 1, 2025 to Notification of Reasons for Rejection mailed Feb. 4, 2025", W/ English Claims, 18 pgs.

"Japanese Application Serial No. 2024-177211, Notification of Reasons for Rejection mailed Jun. 24, 2025", W/English Translation, 8 pgs.

\* cited by examiner

CHUCK SYSTEM FOR A POWERED SURGICAL IMPACTOR

CLAIM OF PRIORITY

This application claims the benefit of U.S. Provisional patent application Ser. No. 63/450,311, filed on Mar. 6, 2023, the benefit of priority of which is claimed hereby, and which is incorporated by reference herein in its entirety.

TECHNICAL FIELD

The disclosure of the present application pertains generally, but not by way of limitation, to systems and methods for providing axial impaction forces to surgical instruments. More particularly, but not by way of limitation, the disclosure of the present application pertains to systems and methods for operatively coupling surgical instruments to powered surgical impactors.

BACKGROUND

During orthopedic surgeries, surgical instruments such as handheld impactors can be used to provide axial impaction forces for various purposes, such as to drive implants into bone, cut or shape bone surfaces, or move bone fragments or bone parts into desired positions. For example, in total hip arthroplasties (e.g., hip replacement procedures), axial impaction forces can be used to help prepare the acetabular cup or the femur of a patient to receive an implant, such as by driving an acetabular implant into the acetabulum, or a broach into the femur to shape an osseous envelope for a femoral implant. The surgical instrument can be manually positioned by the surgeon with respect to a patient by hand, or the surgical instrument can be connected to a robotic arm to help the surgeon more precisely maintain the impactor in one or more positions with respect to the patient. Generally, such axial impaction forces have been imparted to orthopedic surgical instrument via manual mallet strikes thereto. However, in recent years, powered surgical impactors have become available, which can provide more consistent and repeatable axial impaction forces to orthopedic surgical instruments.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1A:
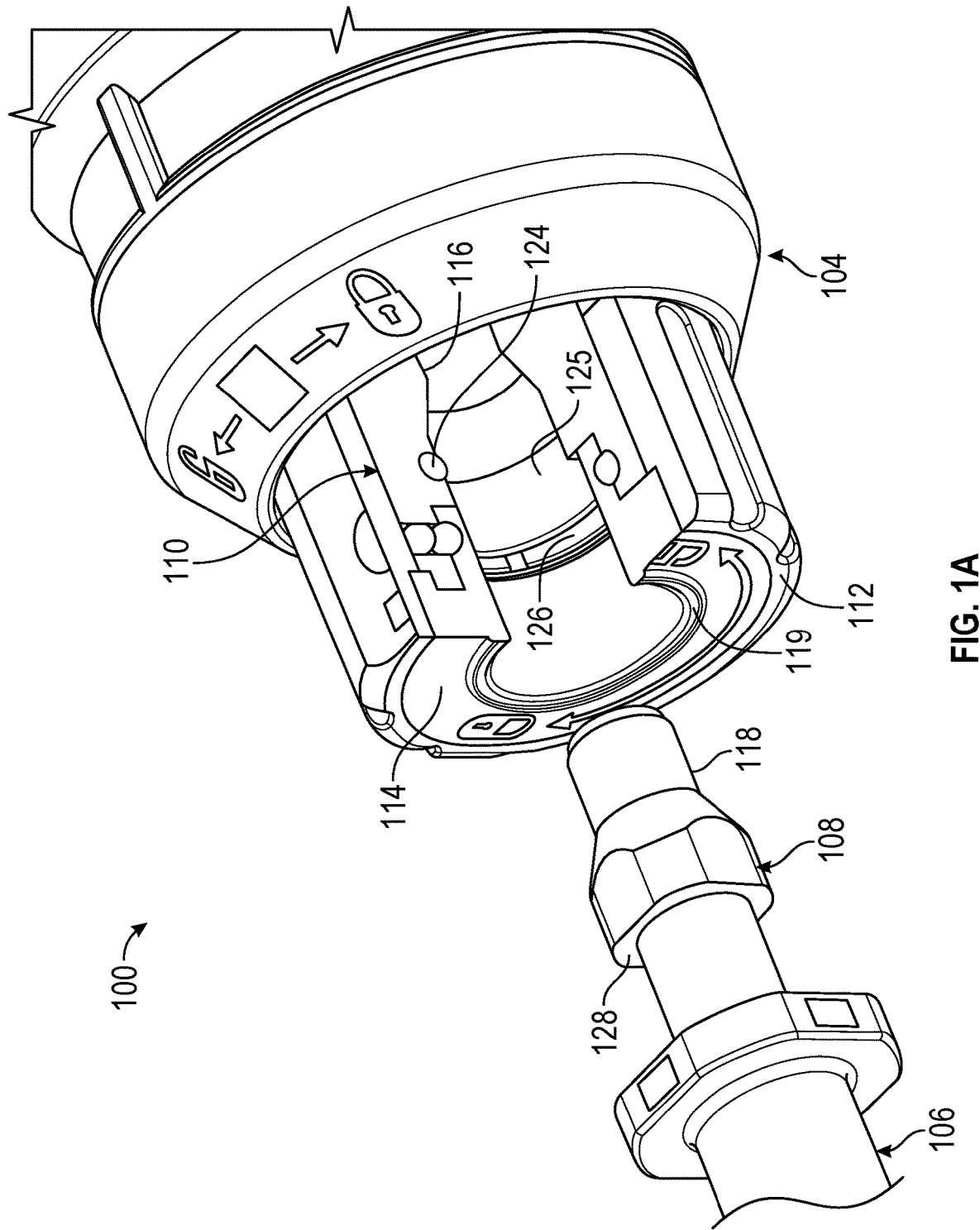
FIG. 1A illustrates a partial cutaway view of a chuck system, in accordance with at least one example of the present application.

The following description and the drawings sufficiently illustrate specific examples to enable those skilled in the art to practice them. Other examples can incorporate structural, process, or other changes. Portions and features of some examples can be included in, or substituted for, those of other examples. Examples set forth in the claims encompass all available equivalents of those claims.

A total hip replacement procedure, or total hip arthroplasty, can involve making an access incision in a hip region of a patient. Various surgical devices configured for intra-procedurally reaming, cutting, broaching, impacting, or otherwise preparing bone surfaces of a patient during total hip arthroplasty can be inserted through the incision, such as to access the proximal femur or the acetabular cup. Preparation of the proximal femur, such as the femoral head, often includes broaching the femur to create an osseous envelope for implant insertion, such as by repeatedly applying axial impaction forces to a surgical instrument in contact with the femur. Preparation of the acetabular cup often involves inserting or otherwise installing an implant into the acetabular cup, such as by repeatedly applying axial impaction forces to a surgical instrument holding or in contact with the implant.

As stated above, such axial impaction forces have generally been applied to orthopedic surgical instruments by hand, such as with repeated manual mallet strikes by a surgeon. However, this can be a difficult and potentially hazardous operation for the surgeon. For example, carefully maintaining the surgical instrument in a position aligned with a single axis while repeatedly striking the impactor with a consistent force can be challenging and fatiguing; and manually striking the impactor with a handheld can lead to repetitive stress injuries over time. Recently, powered surgical impactors have been become available, which can improve clinical outcomes while helping to reduce surgeon fatigue and the potential for work-related injuries. For example, powered surgical impactors can provide a consistent force to a surgical instrument, such as upon a single pull of a trigger, and can help to prevent injuries arising from repetitive and forceful mallet strikes.

As can be appreciated, powered surgical impactors generally include a chuck adapted to receive, and provide axial impaction forces to, a portion of a surgical instrument. However, existing chuck designs for use with surgical impactors can include a number of drawbacks. First, for example, existing chuck designs generally allow for a significant amount of free play between the chuck and the surgical instrument. As a result, such chuck designs often provide limited amount of axial or radial stability, which can increase the difficulty of, and prolong length of, various surgical operations in accordance with a surgical plan, such as by allowing the surgical instrument to move in and out of axial alignment with the surgical impactor. Moreover, significant free play between the chuck and the surgical instrument can lead to increased wear on the chuck and the surgical instrument, varied or reduced forces imparted to the surgical instrument, or other undesirable effects. In view of the above, a need exists for an improved chuck system for use with powered surgical impactors.

The systems and methods disclosed herein provide solutions to the technical problems identified above, among others, such as by providing a chuck system capable of precisely constraining a surgical instrument in six degrees of freedom. For example, the chuck can include a chuck defining a first cylindrical surface, a first face, and a lock projection; and a variety of surgical instruments usable with the chuck can each define a second cylindrical surface, a second face, and a distal end surface. Surface engagement between the first cylindrical surface and the second cylindrical surface can radially constrain the surgical instrument within the chuck, surface engagement between the first face and the second face can prevent the surgical instrument from moving in a proximal direction, and surface engagement between the lock projection and the distal end surface can prevent the surgical instrument from moving in a distal direction. Each of the plurality of surgical instruments can also define a first plurality of planar surfaces, and the chuck can include a cross-pin; and surface engagement between one of the plurality of planar surfaces and the cross-pin can rotationally constrain the surgical instrument within the chuck.

The chuck system of the present disclosure can provide a number of benefits to both patients and surgeons by virtue of precisely constraining a surgical instrument in six degrees of freedom. For example, the chuck system can help a surgeon improve the speed and accuracy at which a surgical instrument can be positioned during an orthopedic surgery, such as to help reduce the amount of effort or concentration required to maintain a surgical instrument in a specific position with respect to a patient or maintain the surgical instrument in alignment with an axis defined by the impactor. This can help to reduce the length of various orthopedic surgeries for a patient while reducing surgeon fatigue.

Additionally, the chuck system can help to increase the consistency and predictability of axial impaction forces applied to a surgical instrument by a powered surgical impactor. For example, the chuck system can reduce force variability and energy losses caused by significant radial or axial movement of a surgical instrument within the chuck. This can help to ensure the impaction forces generated by a powered surgical impactor are efficiently and consistently transferred a surgical instrument, such as to improve bone preservation and reduce the length of various orthopedic surgeries, and thereby help provide a patient with a shorter hospital stay and a reduced recovery time.

While the above and following examples are generally discussed with regard to hip arthroplasties, the chuck system of the present disclosure can be utilized in a wide variety of other orthopedic surgical procedures utilizing axial impaction forces to help perform one or more operations thereof, such as, but not limited to, total shoulder arthroplasties (e.g., shoulder replacement procedures) or knee arthroplasties (e.g., knee replacement procedures).

Figure 1B:
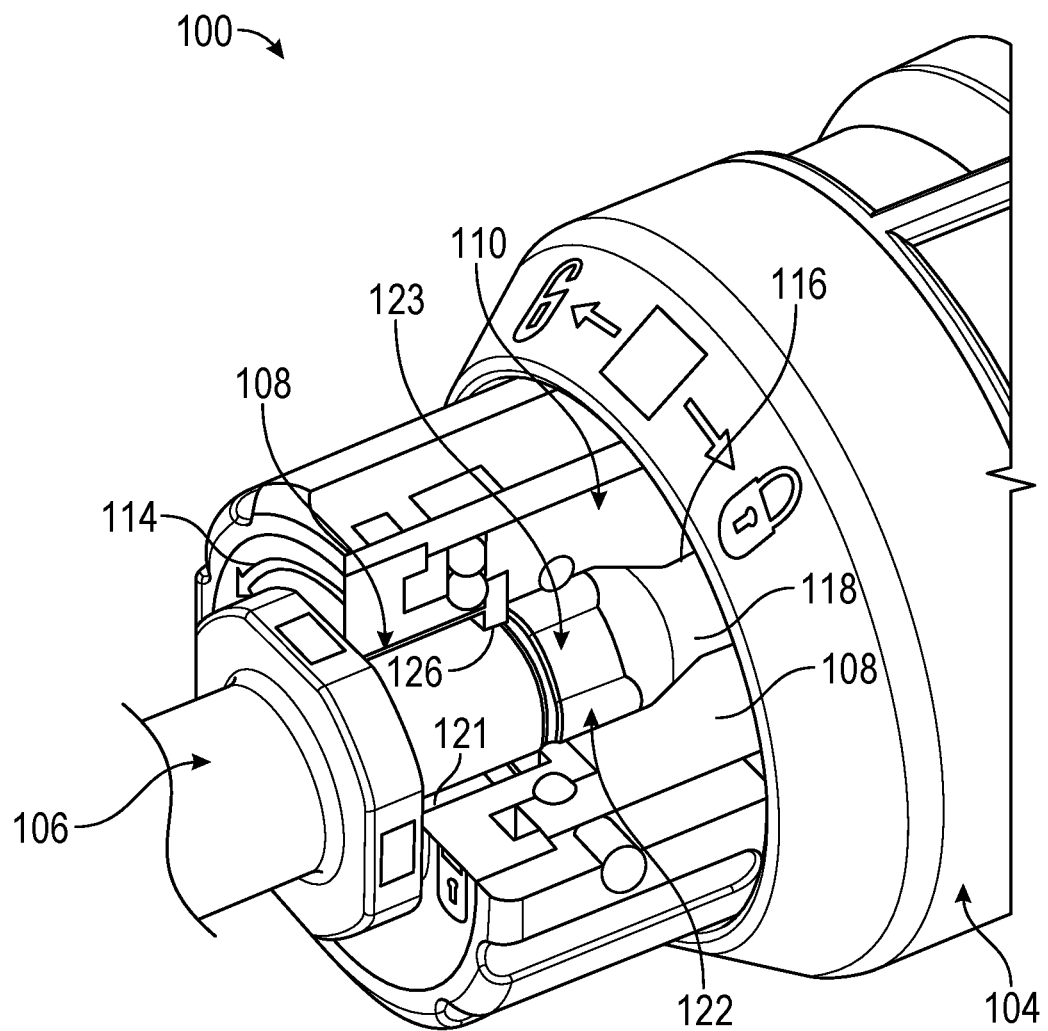
FIG. 1B illustrates a partial cutaway view of a chuck system, in accordance with at least one example of the present application.
Figure 1C:
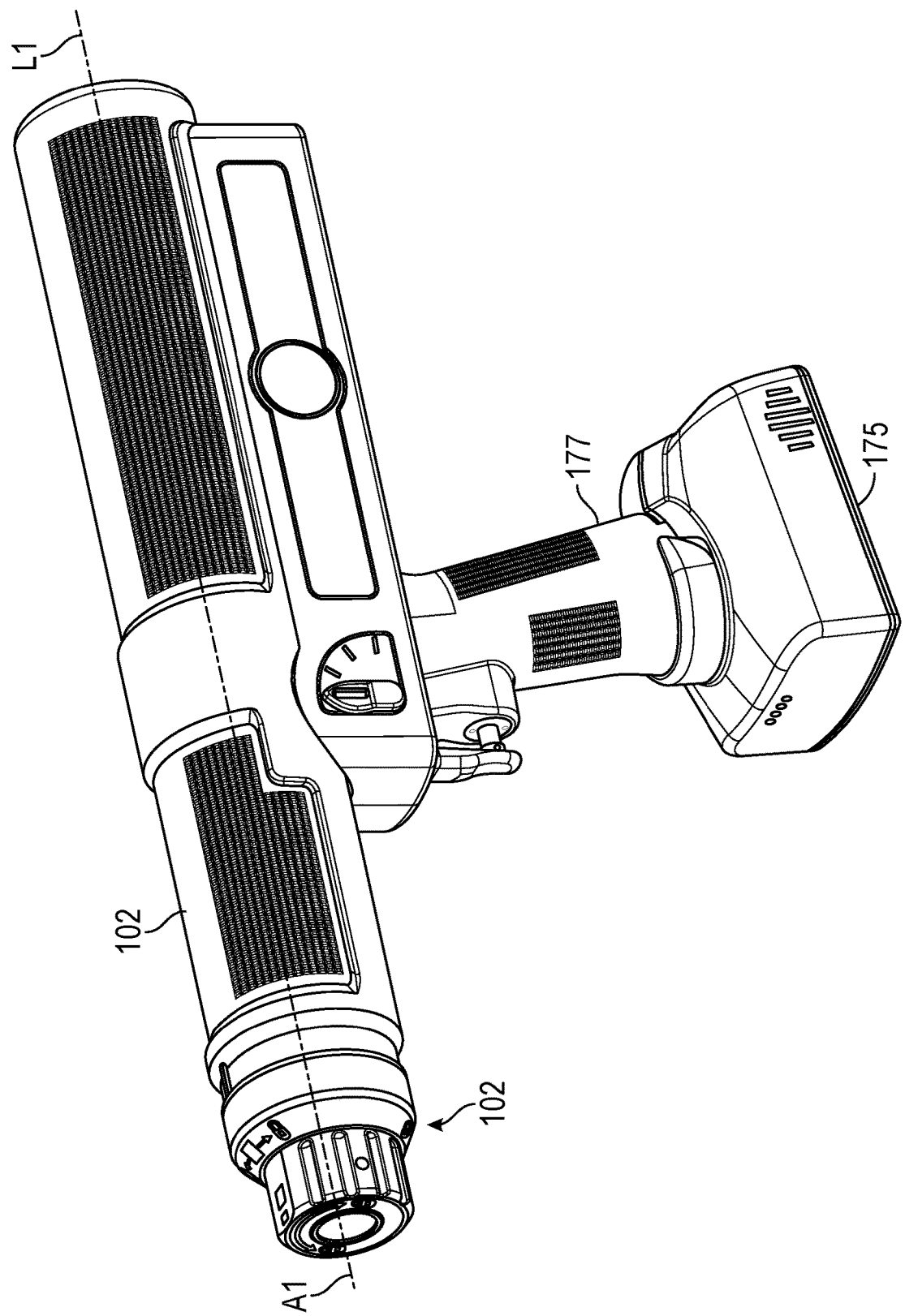
FIG. 1C illustrates a chuck coupled to a surgical impactor, in accordance with at least one example of the present application.

FIG. 1A illustrates a partially cutaway view of a chuck system 100, in accordance with at least one example of the present application. FIG. 1B illustrates a partial cutaway view of the chuck system 100, in accordance with at least one example of the present application. FIG. 1C illustrates an isometric view of a chuck 104 and a surgical impactor 102, in accordance with at least one example of the present application. Also shown in FIG. 1C is a central axis A1 and a longitudinal axis A1. FIGS. 1A-1C are discussed below concurrently. The surgical impactor 102 can generally be a device capable of generating a repeatable axial impaction force in response to one or more user inputs thereto. In one example, such as shown in FIG. 1C, the surgical impactor 102 can be a battery-powered device, such as the X Series® Power System, or the HAMMR impactor, available from Zimmer Biomet, Inc. of Warsaw, Indiana. The chuck system 100 can include the surgical impactor 102 and a surgical instrument 106.

As shown in FIGS. 1A-1B, the surgical impactor 102 can include a first body 110, a second body 112, and a third body 114. The first body 110 can be insertable into the surgical impactor 102 to concentrically center the surgical impactor 102 with respect the chuck 104, such as by aligning the central axis A1 (FIG. 1C) of the surgical impactor 102 with a longitudinal axis L1 (FIG. 1C) defined by the chuck 104. Similarly, the second body 112 can be adapted to receive the first body 110 to locate the second body 112 in a position concentrically aligned with the longitudinal axis L1; and the second body 112 can be adapted to receive the third body 114 to locate the third body 114 with respect to the first body 110, the second body 112, and the longitudinal axis L1. The surgical instrument 106 can generally represent any device adapted to receive axial impaction forces to help perform one or more operations of an orthopedic surgery.

The surgical instrument 106 can include a bit 108. The bit 108 can generally be a portion of the surgical instrument 106 adapted to be inserted into, and received within, the chuck 104. The chuck 104 can be adapted to operatively couple the surgical instrument 106 to the surgical impactor 102 by constraining a bit 108 in six degrees-of-freedom. First, for example, the first body 110 can define a first cylindrical surface 116 and the bit 108 can define a second cylindrical surface 118. The first cylindrical surface 116 can be adapted to contact and engage the second cylindrical surface 118 to maintain the bit 108 in a position concentrically centered with the central axis A1, such as by preventing the bit 108 from moving radially.

Further, the bit 108 can define a first plurality of planar surfaces 122 (FIG. 1B) and a plurality of contacting surfaces 123 (FIG. 1B); and the chuck 104 can include a cross-pin 124 (FIG. 1A), and a third cylindrical surface 125 (FIG. 1A). The cross-pin 124 can be adapted to contact and engage one of the first plurality of planar surfaces 122 to maintain the bit 108 in a selected orientation relative to the central axis A1 and the longitudinal axis L1, such as by preventing the bit 108 from rotating about the central axis A1 and the longitudinal axis L1. The third cylindrical surface 125 can be adapted to contact and engage the plurality of contacting surfaces 123 to maintain the bit 108 in a position concentrically centered with the central axis A1, such as by preventing the bit 108 from moving radially.

Additionally, the bit 108 can define a first plurality of planar surfaces 122 (FIG. 1B) and a plurality of contacting surfaces 123 (FIG. 1B); and the chuck 104 can include a cross-pin 124 (FIG. 1A) and a third cylindrical surface 125 (FIG. 1A). The cross-pin 124 can be adapted to contact and engage one of the first plurality of planar surfaces 122 to maintain the bit 108 in a selected orientation relative to the central axis A1 and the longitudinal axis L1, such as by preventing the bit 108 from rotating about the central axis A1 and the longitudinal axis L1. The third cylindrical surface 125 can be adapted to contact and engage the plurality of contacting surfaces 123 to maintain the bit 108 in a position concentrically centered with the central axis A1, such as by preventing the bit 108 from moving radially.

Second, the third body 114 can define a first face 119 (FIG. 1A) and the bit 108 can define a second face 121 (FIG. 1B). The first face 119 can be adapted to contact and engage the second face 121 to maintain the bit 108 in a position along the central axis A1 or the longitudinal axis A1, such as by preventing the bit 108 from moving axially proximally relative to the central axis A1 and the longitudinal axis L1. Third, the third body 114 can define a lock projection 126, and the bit 108 can define a distal end surface 128 (FIG. 1A). The lock projection 126 can be adapted to contact and engage the distal end surface 128 to maintain the bit 108 in an axial position along the central axis A1 and the longitudinal axis L1, such as by preventing the bit 108 from moving axially distally, relative to the central axis A1 and the longitudinal axis L1. For example, the second body 112 and the third body 114 can be rotatable about the first body 110 to move the lock projection 126 between an unlocked position (shown in FIG. 1A), in which the lock projection 126 can be located to enable the bit 108 to be inserted into the chuck 104, and a locked position (shown in FIG. 1B) in which the lock projection 126 can be located to contact the bit 108 to thereby prevent removal of the bit 108 from the chuck 104.

Figure 7:
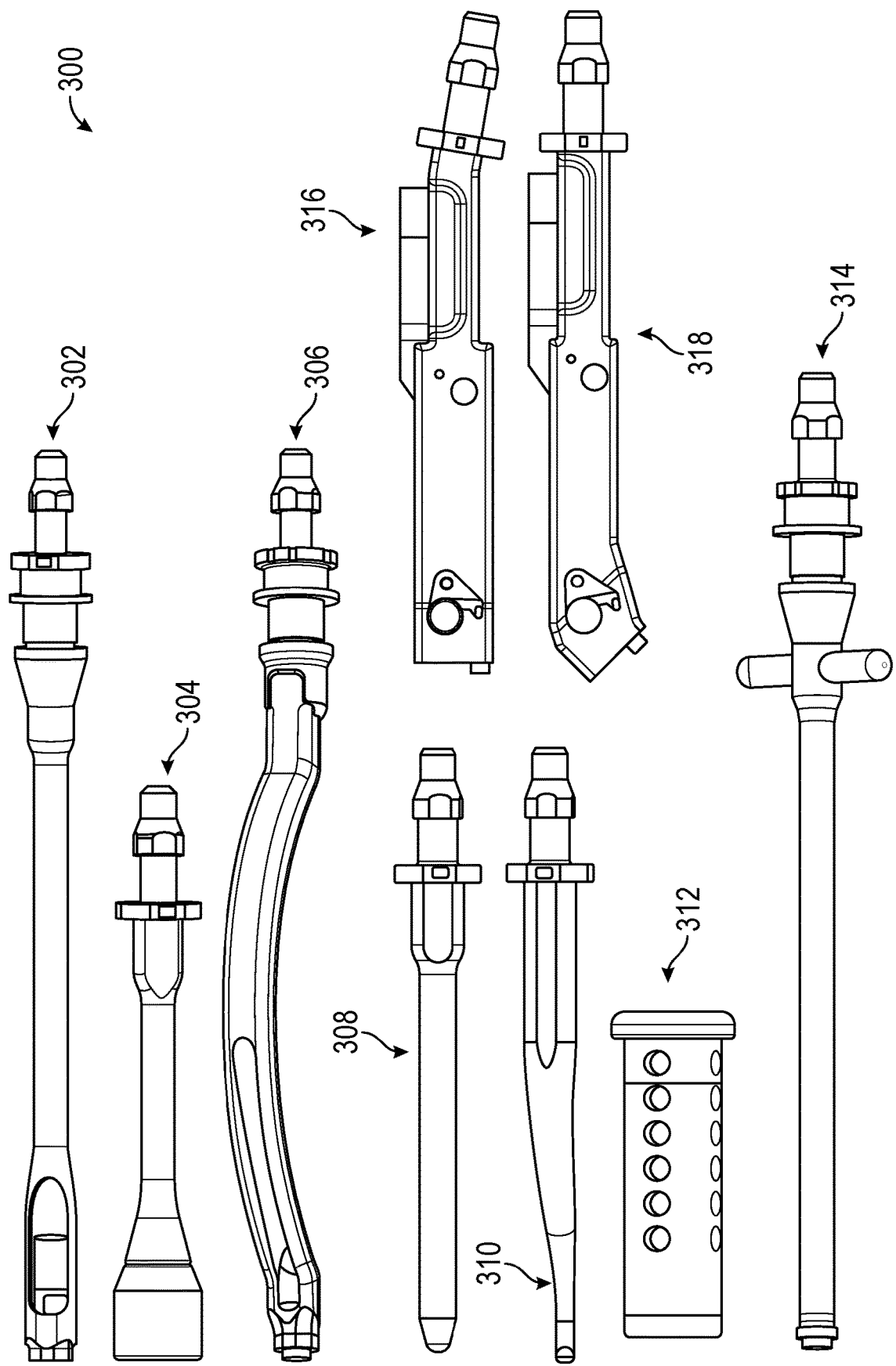
FIG. 7 illustrates a plurality of surgical instruments for use with the chuck of FIGS. 1-6, in accordance with at least one example of the present application.

In the operation of some examples, such as in preparation for, or during, a total hip arthroplasty, a surgeon can first select the surgical instrument 106 from a plurality of surgical instruments each including the bit 108, such as from the plurality of surgical instruments 300 shown in FIG. 7. The surgeon can then selectively position the bit 108 with respect to the chuck 104 by aligning one surface of the first plurality of planar surfaces 122 with the cross-pin 124, such as to position the surgical instrument 106 in an orientation best-suited for one or more operations of the total hip arthroplasty. Next, the surgeon can insert the bit 108 of the surgical instrument 106 into the chuck 104 by moving the bit 108 proximally along the central axis A1 until the second face 121 contacts the first face 119 to prevent additional proximal movement of the surgical instrument 106 relative to the central axis A1 or the longitudinal axis L1. Finally, the surgeon can rotate the lock projection 126 from the unlocked position to the locked position to secure the bit 108 within the chuck 104, such as by rotating the second body 112 about 180 degrees about the central axis A1, to, in turn, cause the third body 114 received therein to rotate about 180 degrees about the central axis A1.

Figure 2:
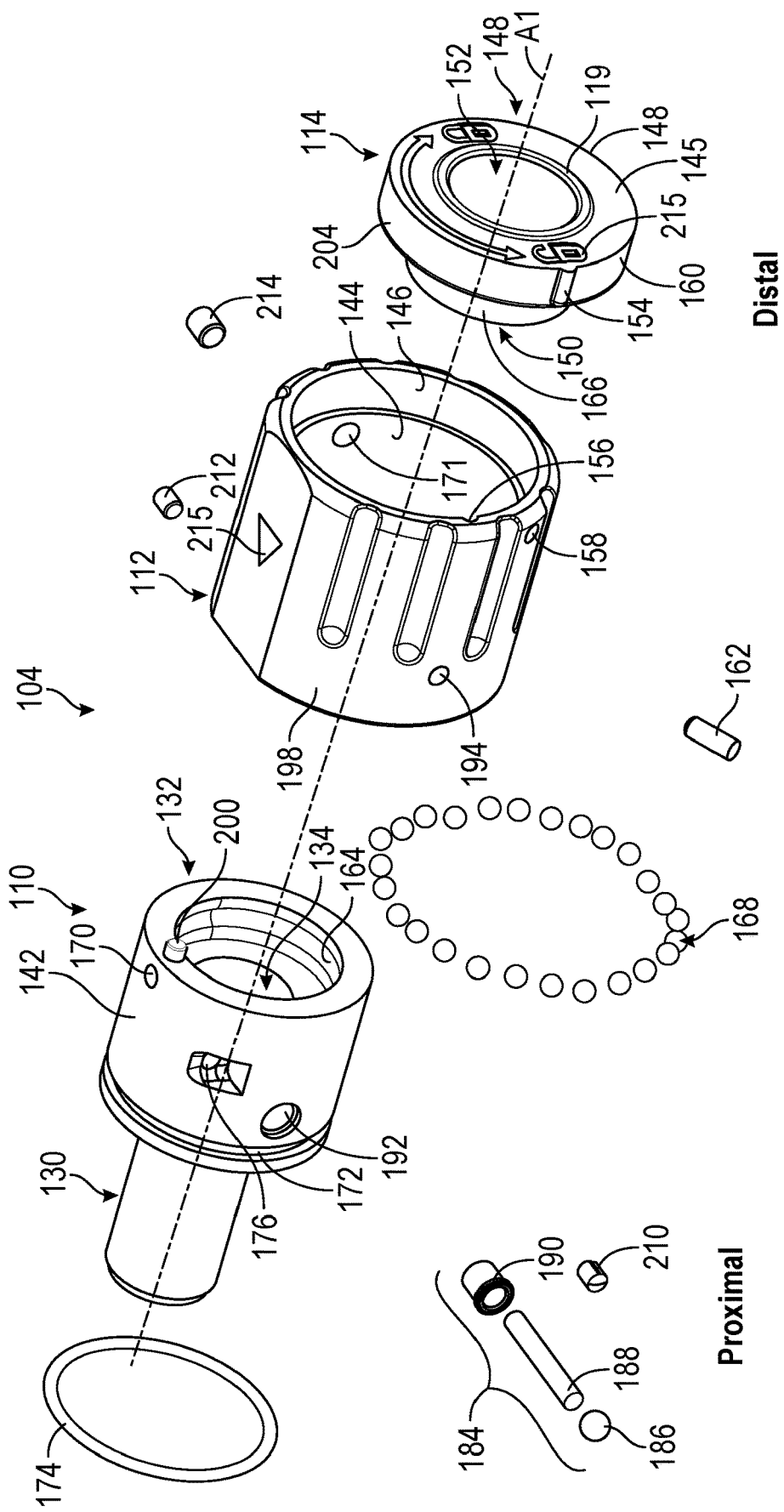
FIG. 2 illustrates an exploded view of a chuck, in accordance with at least one example of the present application.
Figure 3:
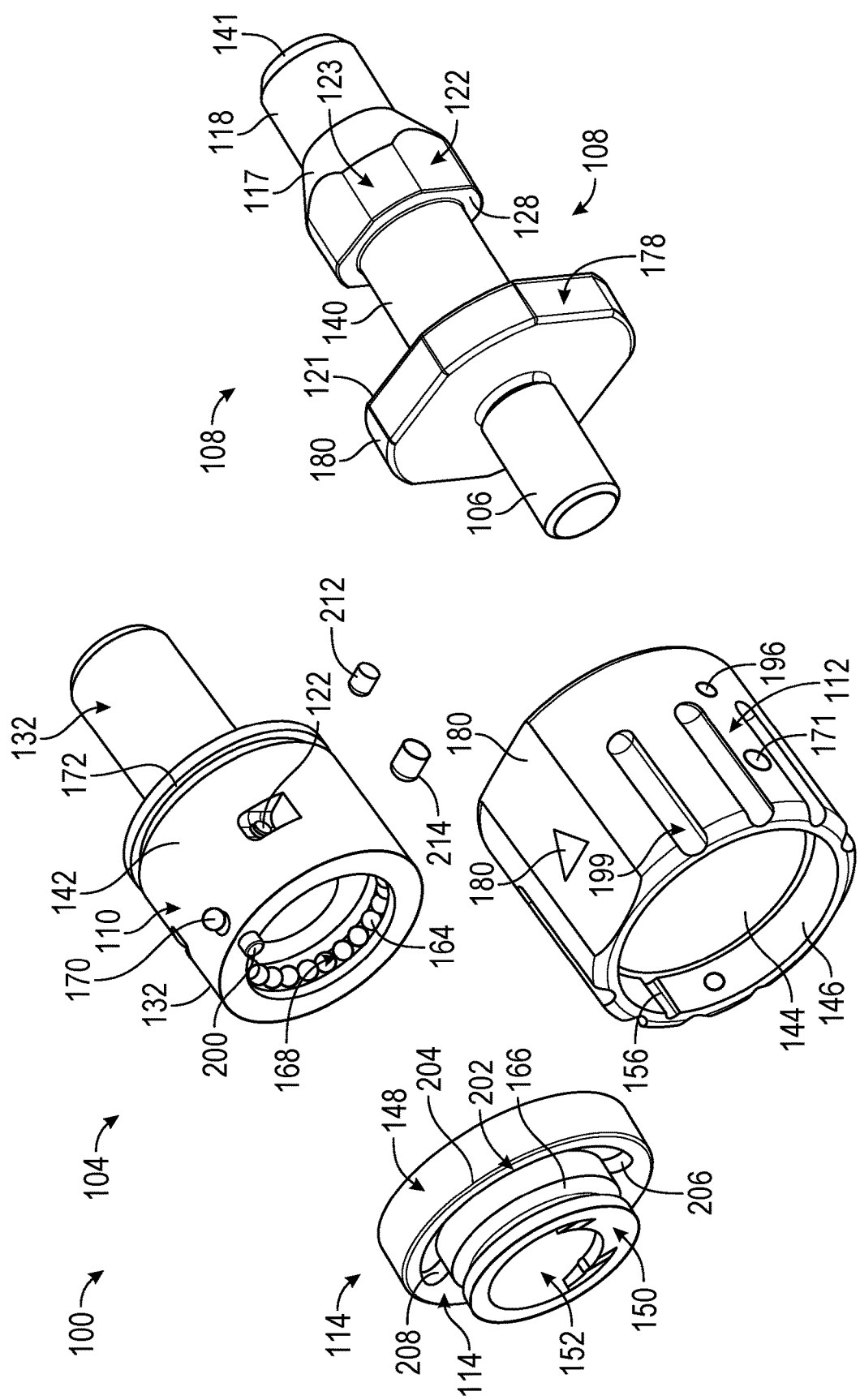
FIG. 3 illustrates an exploded view of a chuck system, in accordance with at least one example of the present application.
Figure 4A:
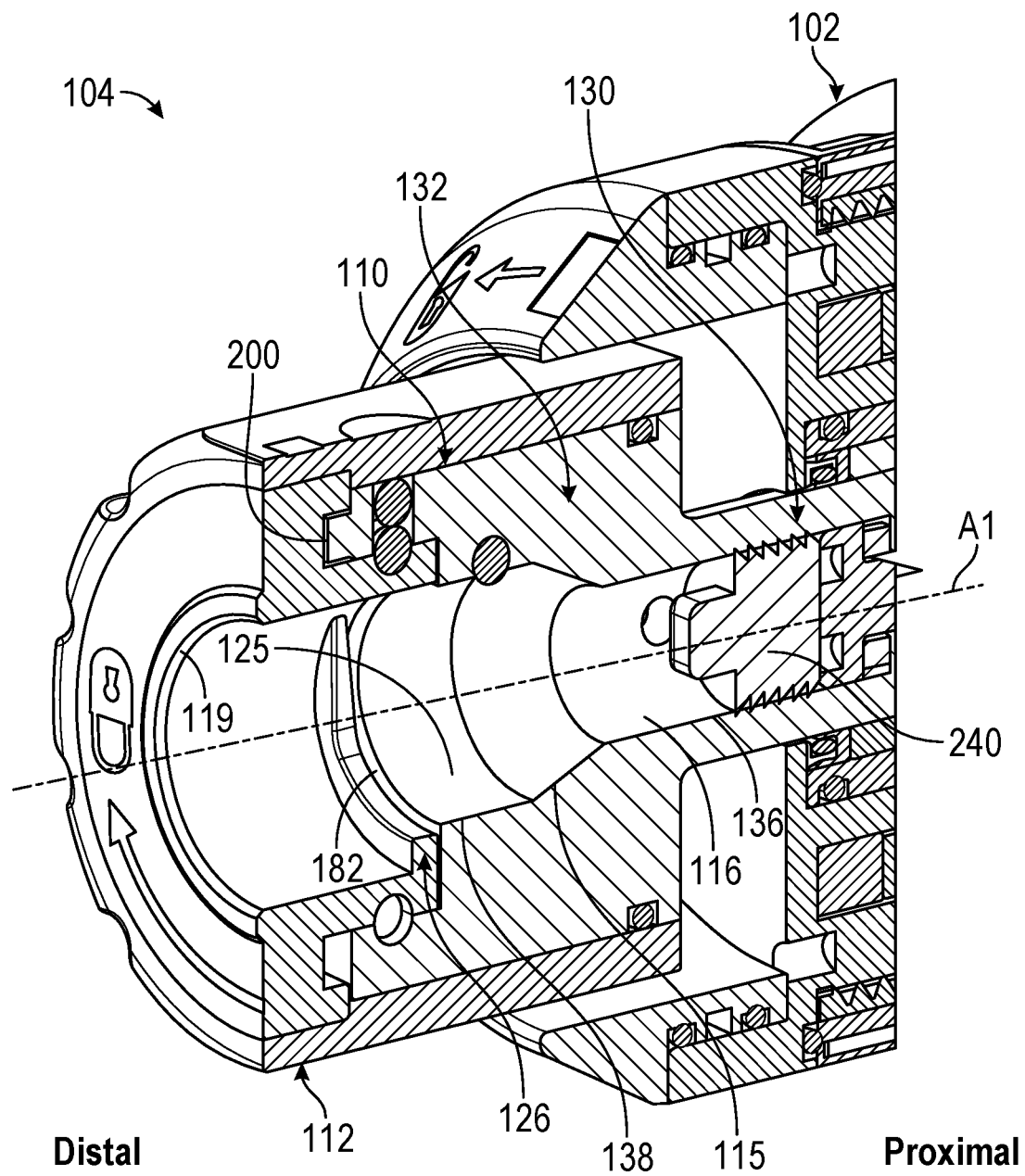
FIG. 4A illustrates a cross-section of a chuck coupled to a surgical impactor, in accordance with at least one example of the present application.
Figure 4B:
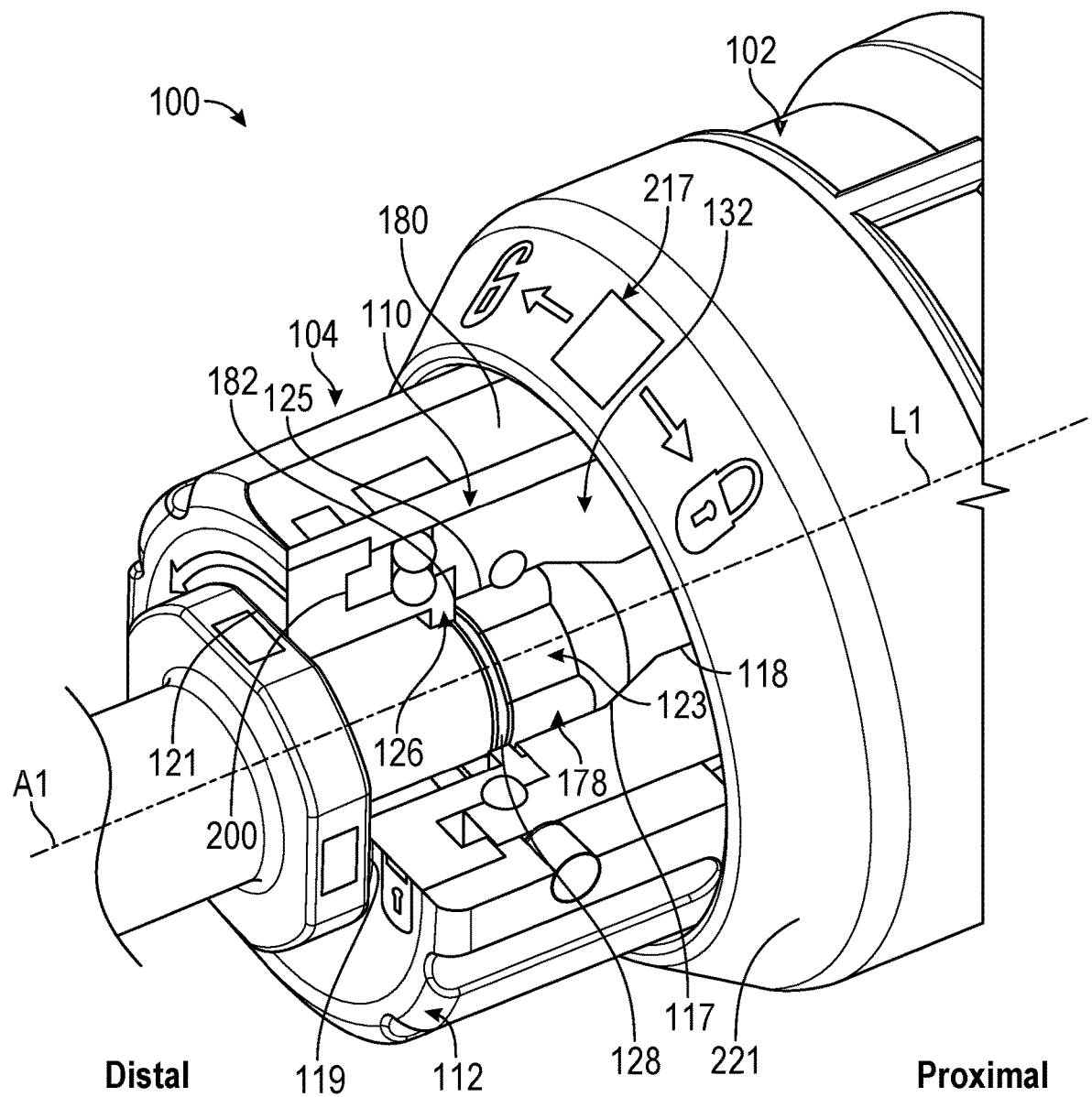
FIG. 4B illustrates a partial cutaway of a chuck system, in accordance with at least one example of the present application.

FIG. 2 illustrates an exploded view of a chuck 104, in accordance with at least one example of the present application. FIG. 3 illustrates an exploded view of a chuck system 100, in accordance with at least one example of the present application. FIG. 4A illustrates a cross-section of a chuck 104 coupled to a surgical impactor 102, in accordance with at least one example of the present application. FIG. 4B illustrates a partial cutaway of a chuck system 100, in accordance with at least one example of the present application. Also shown in FIGS. 2 and 4A are orientation indicators Proximal and Distal, and a central axis A1. Also shown in FIG. 4B are orientation indicators Proximal, Distal, a central axis A1, and a longitudinal axis L1. FIGS. 2-3 are discussed below concurrently. The first body 110 can include a proximal portion 130 (FIGS. 2 & 4A) and a distal portion 132.

Figure 6:
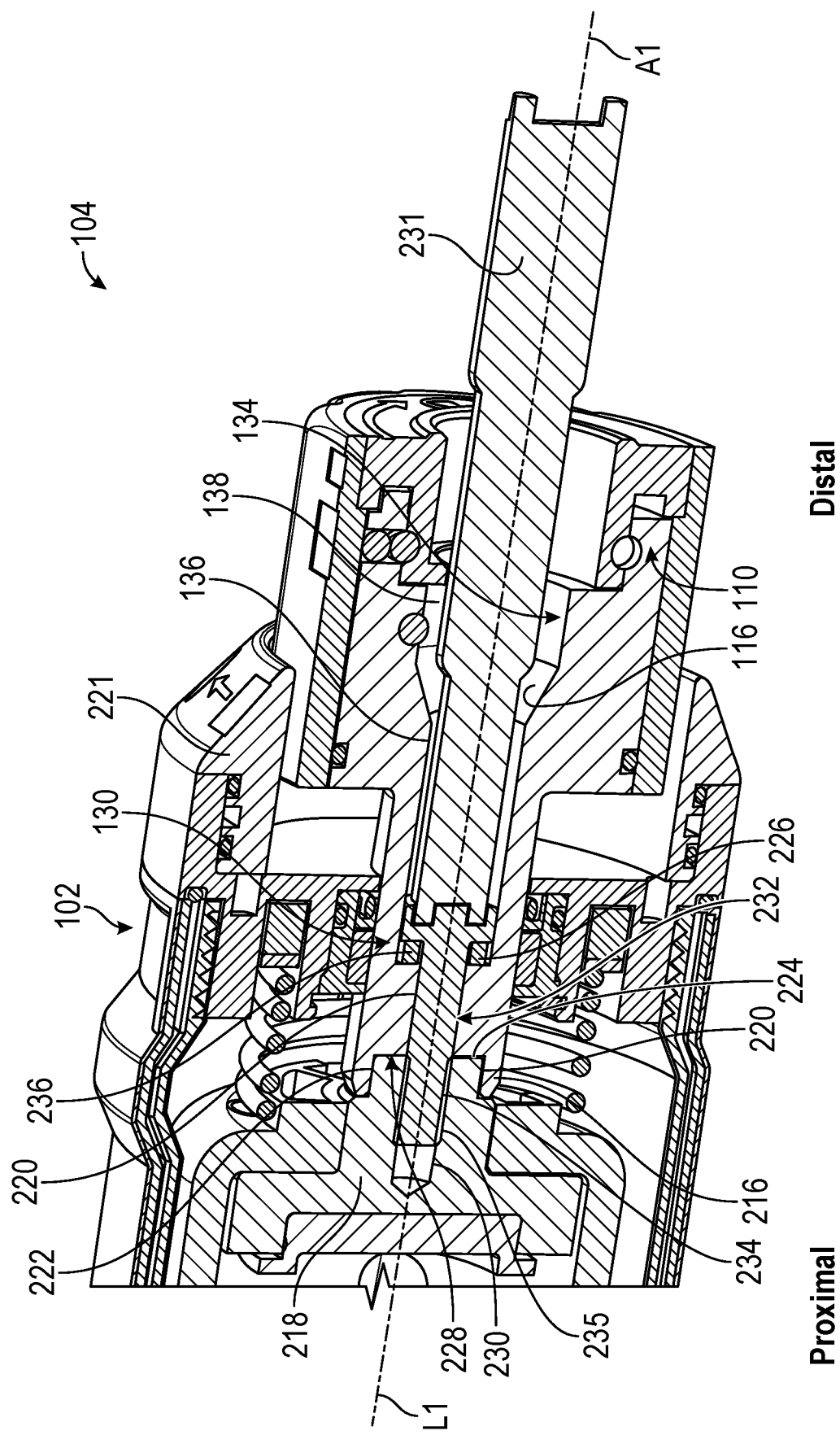
FIG. 6 illustrates a cross-section of a chuck coupled to a surgical impactor 102, in accordance with at least one example of the present application.

The proximal portion 130 can define various three-dimensional shapes, such as including, but not limited to, a cylinder, a cuboidal prism, a triangular prism, a rectangular prism, a hexagonal prism, an octagonal prism, or the like. The proximal portion 130 can be sized and shaped to locate the chuck 104 with respect to the surgical impactor 102. For example, the proximal portion 130 can be sized and shaped to contact and engage one or more surfaces located within the surgical impactor 102, such as shown in FIG. 6, to prevent, or limit, radial, and axial distal, movement of the chuck 104 relative to the central axis A1. The distal portion 132 can define a first bit bore 134 (FIG. 2). The first bit bore 134 can be an aperture extending axially through the distal portion 132 and at least partially within the proximal portion 130. When the proximal portion 130 is received within the surgical impactor 102 (FIGS. 4A & 4B), the first bit bore 134 can be concentrically centered with the longitudinal axis L1.

The first bit bore 134 can include a first portion 136 (FIG. 4A) and a second portion 138 (FIG. 4A). The first portion 136 and the second portion 138 can be opposite proximal and distal portions, respectively, of the first bit bore 134. The first portion 136 can define a diameter smaller than a diameter defined by the second portion 138. The first cylindrical surface 116 (FIG. 4A) can a surface partially, or completely, forming the first portion 136 of the first bit bore 134. The third cylindrical surface 125 (FIGS. 4A-4B) can be a surface partially, or completely, forming the second portion 138 of the first bit bore 134. The bit 108 can also include a first tapered surface 115 (FIG. 4A). The first tapered surface 115 can form a frustoconical, conical, or inwardly tapered shape. The first tapered surface 115 can extend at various angles relative to the central axis A1 between the first portion 136 and the second portion 138. For example, the first tapered surface 115 can extend at, but not limited to, about a 15 degree and about a 35 degree angle relative to the central axis A1. In one example, such as shown in FIG. 4A, the first tapered surface 115 can extend at a 25 degree angle relative to the central axis A1.

The bit 108 can include a first cam surface 117 (FIGS. 3 &4B) and the second cylindrical surface 118 (FIGS. 3 & 4B). The second cylindrical surface 118 of the bit 108 can be located proximally to the first cam surface 117. The second cylindrical surface 118 can contact and engage the first cylindrical surface 116 of the first body 110 within the first portion 136 of the first bit bore 134 to prevent, or limit, radial movement of the bit 108 relative to the central axis A1 of the chuck 104. In some examples, the bit 108 can define a fourth cylindrical surface 140 (FIG. 3) and a second cam surface 141 (FIG. 3). The first cam surface 117 and the second cam surface 141 can each form a frustoconical, conical, or outwardly tapered shape. The first cam surface 117 can correspond to the first tapered surface 115. For example, the first cam surface 117 can extend at an angle similar to an angle the first tapered surface 115 extends at relative to the central axis A1.

The second cam surface 141 can be located proximally to the second cylindrical surface 118 and the fourth cylindrical surface 140 along the bit 108. For example, the second cylindrical surface 118 can extend axially between the first cam surface 117 and the second cam surface 141. During insertion of the bit 108 into the chuck 104, the second cam surface 141 can contact and slidingly engage the first body 110, such as by contacting the first tapered surface 115 or the first face 119 to help guide the first cylindrical surface 116 of the bit 108 into the first portion 136 of the first bit bore 134. Subsequently, once the fourth cylindrical surface 140 has at least partially entered the first portion 136, the first cam surface 117 can begin to contact and slidingly engage the first cylindrical surface 116 to concentrically center the bit 108 within the chuck 104.

The third body 114 can define the first face 119 (FIGS. 2, 4A, & 4B); and the bit 108 can define the second face 121 (FIGS. 3 & 4B). The first face 119 can be a distal-most portion or feature of the third body 114. For example, the first face 119 can be located distally to, or otherwise protrude distally outward from, a distal surface 145 (FIG. 2) of the third body 114. The second face 121 can be a planar surface of the bit 108 or the surgical instrument 106, such as extending orthogonally to the central axis A1 and the longitudinal axis L1 when the bit 108 is located within the chuck 104. The second face 121 can be located proximally to the first cam surface 117; and can extend between the fourth cylindrical surface 140 and a second plurality of planar surfaces 178 (FIGS. 3 & 4B) of the bit 108.

The first face 119 can be adapted to contact and engage the second face 121 to prevent, or limit, axial movement of the bit 108 relative to the central axis A1 of the chuck 104. For example, the bit 108 can be fully inserted into the chuck 104 once the second face 121 of the bit 108 is in contact with the first face 119 of the third body 114; and surface engagement between the first face 119 and the second face 121 can prevent or limit proximal axial movement of the bit 108 relative to the chuck 104 and the longitudinal axis L1. Additionally, when the bit 108 is fully inserted into the chuck 104, surface engagement between the second cylindrical surface 118 and the first cylindrical surface 116 of the first body 110, and surface engagement between the plurality of contacting surfaces 123 (FIG. 3) and the third cylindrical surface 125, can help to prevent or limit the bit 108 from moving in a radial direction relative the central axis A1 or the longitudinal axis L1. In view of the foregoing, the bit 108, the first body 110, and the third body 114 can engage one other to precisely control, or constrain, proximal axial and radial movement of the surgical instrument 106 relative to the surgical impactor 102.

The distal portion 132 can define an outer surface 142 (FIGS. 2-3). The outer surface 142 can form various three-dimensional shapes, such as including, but not limited to, a cylindrical shape. The second body 112 can define an inner surface 144 (FIGS. 2-3). The inner surface 144 can form various three-dimensional shapes, such as including, but not limited to, a cylindrical shape. The outer surface 142 can be sized and shaped to circumferentially encompass the inner surface 144, such as to enable the second body 112 to partially receive the first body 110 therein. The second body 112 can define a second inner surface 146. The second inner surface 146 can form various three-dimensional shapes, such as including, but not limited to, a cylinder, a cuboidal prism, a triangular prism, a rectangular prism, a hexagonal prism, an octagonal prism, or the like. The second inner surface 146 can define a diameter larger than a diameter defined by the inner surface 144. The third body 114 can include a head portion 148 and a body portion 150 (FIGS. 2-3). The head portion 148 and the body portion 150 can generally be opposite proximal and distal portions, respectively, of the third body 114.

The head portion 148 and the body portion 150 can form various three-dimensional shapes, such as including, but not limited to, a cylinder, a cuboidal prism, a triangular prism, a rectangular prism, a hexagonal prism, an octagonal prism, or the like. The head portion 148 can be sized and shaped to be encompassed, or otherwise be received within, the second inner surface 146 of the second body 112. In one example, the head portion 148 can define a diameter that is greater than a diameter defined by the body portion 150. The second body 112 can define a second bit bore 152 (FIGS. 2-3). The second bit bore 152 can be an aperture extending axially through the head portion 148 and the body portion 150 of the second body 112.

The head portion 148 can be sized and shaped to contact the second inner surface 146 of the second body 112 to position the third body 114 within the second body 112. The first bit bore 134 can define the central axis A1. In some examples, the head portion 148 can define a projection 154 (FIG. 2) and the second body 112 can define a notch 156 (FIGS. 2-3). The projection 154 can be a protrusion extending radially outward beyond an outer diameter or outermost surface of the head portion 148. The notch 156 can be a groove or recess extending into the second body 112 that is recessed relative to the second inner surface 146. The projection 154 and the notch 156 can extend parallel to, and laterally offset from, the central axis A1. The notch 156 can be sized and shaped to receive the projection 154, such as to help prevent relative rotation between the second body 112 and the third body 114.

Alternatively, or additionally to the projection 154 and the notch 156, the second body 112 can define a first aperture 158 (FIG. 2) and the third body 114 can define a second aperture 160 (FIG. 2). The first aperture 158 and the second aperture 160 can be bores extending transversely through the second body 112 and the third body 114, respectively. The first aperture 158 and the second aperture 160 can be formed in corresponding radial positions relative to the central axis A1 to enable the first aperture 158 and the second aperture 160 to be axially aligned, such as when the projection 154 is received within the notch 156. In such example, the chuck 104 can include a first pin 162 (FIG. 2). The first pin 162 can be sized and shaped to be concurrently received within, or extending concurrently through, the first aperture 158 and the second aperture 160 to thereby prevent or limit axial movement, and relative rotation between, the second body 112 and the third body 114.

The first body 110 can define a first annular groove 164 (FIGS. 2-3) and the third body 114 can define a second annular groove 166 (FIGS. 2-3). The first annular groove 164 can be a C-shaped or U-shaped recess extending radially outwardly within the first body 110. The first annular groove 164 can be defined within the first body 110 in a position distal to the second portion 138 of the first bit bore 134. The second annular groove 166 can be a C-shaped or U-shaped recess extending radially inwardly into the body portion 150 of the third body 114. The first annular groove 164 and the second annular groove 166 can be located concentrically with respect the central axis A1 and the longitudinal axis L1; and can be located in corresponding axial positions along the central axis A1 or the longitudinal axis A1.

The chuck 104 can include a plurality of ball bearings 168. The plurality of ball bearings 168 can be adapted to be concurrently received within the first annular groove 164 and the second annular groove 166. The plurality of ball bearings 168 can rotatably support the third body 114 and the second body 112 with respect to the first body 110. For example, the plurality of ball bearings 168 can be sized and shaped to maintain a radial or annular gap between the body portion 150 and first body 110, and the inner surface 144 and outer surface 142 of the distal portion 132, when the chuck 104 is in an assembled state, such as shown in FIGS. 4A-4B. In view of the above, the plurality of ball bearings 168 can transfer proximal or distal axial forces, such as impaction forces provided to the first body 110 to the third body 114 and the second body 112 by the surgical impactor 102, while reducing rotational friction between the inner surface 144 and outer surface 142.

The first body 110 can define a first bearing aperture 170 (FIGS. 2-3) and the second body 112 can define a second bearing aperture 171 (FIG. 3). The first bearing aperture 170 can extend transversely or radially through the first body 110; and the second bearing aperture 171 can extend transversely or radially though the second body 112. The first bearing aperture 170 and the second bearing aperture 171 can be formed in corresponding radial, and axial, positions relative to the central axis A1 to enable the first bearing aperture 170 and the second bearing aperture 171 to be axially aligned during assembly for the chuck 104. The first bearing aperture 170 and the second bearing aperture 171 can also be formed in corresponding axial positions with the first annular groove 164 and the second annular groove 166, respectively. The plurality of ball bearings 168 can each be sized and shaped to pass through the first bearing aperture 170 and the second bearing aperture 171. The first bearing aperture 170 and the second bearing aperture 171 can thereby enable the plurality of ball bearings 168 to be inserted between the first body 110 and the third body 114.

The distal portion 132 of the first body 110 can define a third annular groove 172 (FIG. 2). The third annular groove 172 can be a C-shaped or a U-shaped recess extending radially inwardly into the first body 110 from the outer surface 142. The chuck 104 can include a first scaling element 174 (FIG. 2). The first scaling element 174 can be, but is not limited to, a polysiloxane, polymeric, or elastomeric O-ring. The first sealing element 174 can be sized and shaped to be at least partially received within the third annular groove 172. For example, when the first sealing element 174 is received within the third annular groove 172, the first sealing element 174 can project radially outward beyond the outer surface 142 of the first body 110 to be compressively clamped between the inner surface 144 and the outer surface 142. The first sealing element 174 can thereby establish a fluid tight seal between the first body 110 and the second body 112 by preventing fluids from exiting the chuck 104 from between the outer surface 142 and the inner surface 144, while increasing rotational friction between the first body 110 and the second body 112.

The first body 110 can define a pin bore 176 (FIG. 2). The pin bore 176 can be an aperture extending transversely or radially through the first body 110. The cross-pin 124 (FIG. 3) can be sized and shaped to contact and engage the first body 110 within the pin bore 176, such as via a press fit. The pin bore 176 can extend across a portion of the first bit bore 134, such as by extending through the first body 110 orthogonally to the central axis A1. For example, the pin bore 176 can extend across the first bit bore 134 within the second portion 138, such that the cross-pin 124 can be posited to contact and engage one of the first plurality of planar surfaces 122 (FIGS. 3 & 4B) to prevent rotation of the bit 108 within the chuck 104.

The first plurality of planar surfaces 122 and the plurality of contacting surfaces 123 can be distributed about the bit 108 in an annular arrangement. Each contacting surface of the plurality of contacting surfaces 123 can separate, or otherwise circumferentially or radially space apart, each planar surface of the plurality of planar surfaces 122. Each contacting surface of the plurality of contacting surfaces 123 can be adapted to contact and engage the third cylindrical surface 125 (FIGS. 4A-4B) of the first body 110. In some examples, the surgical instrument 106 (FIGS. 3 & 4B) can also include the second plurality of planar surfaces 178 (FIGS. 3 & 4B). The second plurality of planar surfaces 178 can also be distributed in an annular arrangement. The first plurality of planar surfaces 122 and the second plurality of planar surfaces 178 can include various numbers of individual planar surfaces, such as, but not limited to, two, three, four, five, or six planar surfaces spaced equidistantly apart about the bit 108 relative to the central axis A1. Each planar surface of the first plurality of planar surfaces 122, and each planar surface of the second plurality of planar surfaces 178, can be radially spaced apart from one another about the central axis A1 depending on the number of individual planar surfaces that each of the first plurality of planar surfaces 122 and each of the second plurality of planar surfaces 178 includes.

For example, if the first plurality of planar surfaces 122 and the second plurality of planar surfaces 178 each include four planar surfaces, such as shown in FIGS. 3 & 4B, each planar surface of the first plurality of planar surfaces 122 and the second plurality of planar surfaces 178 can be located orthogonally, or at ninety-degree angle, relative to one another. Alternatively, if the first plurality of planar surfaces 122 and the second plurality of planar surfaces 178 each include three, five, or six planar surfaces, each planar surface of the first plurality of planar surfaces 122 and the second plurality of planar surfaces 178 can be located at a 120 degree, a 72 degree, or a 60 degree angle with respect to one another, respectively.

As can be appreciated, such examples can provide a surgeon with the option of selectively positioning (e.g., orienting) the surgical instrument 106 (FIG. 3) in three, four, five, six, or other numbers of different orientations with respect to the chuck 104. This can help a surgeon to perform one or more operations of an orthopedic surgery. For example, changing the orientation of the surgical instrument 106 with respect to the surgical impactor 102 may help the surgical instrument 106 to extend around various anatomical features of a patient, such as to help the surgical instrument 106 access the acetabulum or the femur in a total hip arthroplasty. In one such example, a surgeon may remove the bit 108 from the chuck 104, rotate the surgical instrument 106 about 180 degrees relative to the central axis A1, and reinsert the bit 108 into the chuck 104, such as to cause a battery 175 (FIG. 1) or handle 177 (FIG. 1) of the surgical impactor 102 to point in an upward direction to thereby avoid contact with a patient during one or more operations of an orthopedic surgery.

The second plurality of planar surfaces 178 can be adapted to help a surgeon selectively position the bit 108 within the chuck 104. First, the number of individual planar surfaces that the second plurality of planar surfaces 178 includes and radial spacing of each planar surface thereof relative to one another, can correspond to the number of individual planar surfaces defined by the first plurality of planar surfaces 122 and radial spacing of each planar surface thereof relative to one another. A radial position of one of the second plurality of planar surfaces 178 can therefrom be indicative of a radial position of a planar surface of the first plurality of planar surfaces 122 extending parallel thereto. Second, the second body 112 can define a reference surface 180 (FIGS. 3 & 4B).

The reference surface 180 can be an outer planar surface of the second body 112, such as forming a portion of an outer diameter thereof. The reference surface 180 can be adapted to extend parallel to the cross-pin 124 when the lock projection 126 is in the unlocked position. In view of the above, a surgeon during can visually align one planar surface of the second plurality of planar surfaces 178 with the reference surface 180 before, or during, insertion of the bit 108 into the chuck 104 to ensure that a desired planar surface, such as corresponding to a desired orientation of the surgical instrument 106 relative to the surgical impactor 102, of the first plurality of planar surfaces 122 contacts and engages the cross-pin 124 when the bit 108 is received within the chuck 104.

The lock projection 126 (FIGS. 4A-4B) of the third body 114 can extend radially inward into the second bit bore 152 defined by the third body 114. The lock projection 126 can form a variety of three-dimensional shapes. In one example, the lock projection 126 can form a semi-annular shape. For example, the lock projection 126 can extend between, but not limited to, about 90 degrees and about 210 degrees around the central axis A1. In one example, the lock projection 126 can extend about 140 degrees around the central axis A1. The lock projection 126 can extend radially inward into the second bit bore 152 defined by the third body 114. The lock projection 126 can define a proximal end surface 182 (FIGS. 4A & 4B). The proximal end surface 182 can be a surface of the lock projection 126 extending orthogonally relative to the central axis A1. The distal end surface 128 (FIGS. 3 & 4B) can, in some examples, be a distal-most surface of the bit 108. The distal end surface 128 can extend orthogonally to the central axis when the bit 108 is received within the chuck 104.

The lock projection 126 can form a variety of three-dimensional shapes. In one example, such as shown in FIGS. 4A-4B, the lock projection 126 can form a semi-annular shape, such as extending between, but not limited to, about 170 and about 190 degrees about a surface of the third body 114 defining the second bit bore 152. The lock projection 126 can be configured to move between the locked position and the unlocked rotation, or vice versa, by rotating the third body 114 between, but not limited to, about 90 degrees and about 360 degrees about to the central axis A1. The lock projection 126 can be adapted to move eccentrically (e.g., both radially and laterally), relative to the central axis A1 during rotation of the third body 114 and the second body 112.

For example, when the lock projection 126 is in the unlocked position as shown in FIG. 4A, the proximal end surface 182 of the lock projection 126 can be laterally offset from the central axis A1 to enable the bit 108 to freely inserted into, or removed from, the chuck 104; and, when the lock projection 126 is in the locked position shown in FIG. 4B, the proximal end surface 182 can intersect the central axis A1 at an orthogonal angle to prevent the bit 108 from being removed from the chuck 104, such as by contacting and engaging the distal end surface 128 (FIGS. 3 & 4B) of the bit 108 to limit distal translation of the bit 108 along the central axis A1.

In some examples, the chuck 104 can include a detent 184 (FIG. 2). The detent 184 can be, for example, but not limited to, a ball detent as shown in FIG. 2. The detent 184 can include a ball 186, a detent pin 188, an insert 190, and a detent bore 192 (FIG. 2). The detent bore 192 can be an aperture extending transversely or radially into the distal portion 132 of the first body 110. The insert 190 can be a flanged inserted adapted to be at least partially received within the detent bore 192. The insert 190 can be sized and shaped to receive the detent pin 188, such as to locate the detent pin 188 with respect to the first body 110. When the detent pin 188 is received within the insert 190, the ball 186 can be at least partially received within the insert 190. For example, a portion of the ball 186 can protrude or extend radially outward from the insert 190 and beyond the outer surface 142 of the distal portion 132. In some examples, the detent 184 can also include a spring receivable within the insert 190 to help bias the ball 186 away from the first body 110.

The second body 112 can define an outermost surface 198 (FIGS. 2-3). The outermost surface 198 can define various three-dimensional shapes, such as including, but not limited to, a cylinder, a cuboidal prism, a triangular prism, a rectangular prism, a hexagonal prism, an octagonal prism, or the like. In some examples, the outermost surface 198 can include a grip feature 199 (FIG. 2) adapted to help a surgeon rotate the second body 112. The grip feature 199 can be, for example, but not limited to, a plurality of grooves extending parallel and laterally offset from the central axis A1, or knurling, crosshatching, or other recessed patterns extending radially inwardly into the second body 112.

The second body 112 can define a first recess 194 (FIG. 2) and a second recess 196 (FIG. 3). The first recess 194 and the second recess 196 can each be a bore or aperture extending transversely or radially through the second body 112, such as between the inner surface 144 and the outermost surface 198 thereof. The first recess 194 and the second recess 196 can each be sized and shaped to partially receive the ball 186 of the detent 184. The first recess 194 and the second recess 196 can be formed in corresponding axial positions relative to the detent bore 192 of the first body 110, such as to enable the first recess 194 and the second recess 196 to be axially aligned with the detent bore 192 based on an orientation, or radial position, of the second body 112 relative to the central axis A1.

For example, when the lock projection 126 of the third body 114 is in the unlocked position, the ball 186 can be at least partially received in the first recess and at least partially received in the insert 190. Similarly, when the lock projection 126 of the third body 114 is in the locked position, the ball 186 can be at least partially received in the first recess 194 and at least partially received in the insert 190. The first recess 194 and the second recess 196 can be circumferentially offset, or spaced radially apart, from each other based on a configuration of the lock projection 126. For example, if the lock projection 126 is configured to move between the locked position and the unlocked position when the third body 114 is rotated about 90 degrees, 180 degrees, 270 degrees, or 360 degrees around the central axis A1, the first recess 194 and the second recess 196 can be circumferentially offset, or spaced radially apart, within the second body 112 by about 90 degrees, 180 degrees, 270 degrees, or 360 degrees, respectively.

In view of the above, the detent 184, together with the first recess 194 and the second recess 196, can increase the rotational force required to rotate the second body 112, and thereby, rotational force required to the move the lock projection 126 out of the unlocked position or the locked position. This can help to maintain the lock projection 126 in the unlocked position or the locked position, such as to prevent the lock projection 126 from being unintentionally rotated into a position obstructing the bit 108 from entering the chuck 104 or prevent the lock projection 126 from being unintentionally rotated into a position allowing the bit 108 to be removed from the chuck 104.

The first body 110 can define a protrusion 200. The protrusion 200 can be a distal-most portion or segment of the first body 110. The protrusion 200 can extend parallel to, and laterally offset from, the central axis A1 or the longitudinal axis L1. The protrusion 200 form a variety of three-dimensional shapes, such as including a cylinder, a cuboidal prism, a triangular prism, a rectangular prism, a hexagonal prism, an octagonal prism, or the like. The head portion 148 of the second body 112 can define a semi-annular groove 202 (FIG. 3). The semi-annular groove 202 can be a recessed area of the head portion 148 that is distally offset relative to a proximal surface 204 (FIGS. 2-3) of the head portion 148. The semi-annular groove 202 can be sized and shaped to receive the protrusion 200 when the chuck 104 is in an assembled state, such as to reduce radial and axial movement between the first body 110 and the third body 114 during rotation of the third body around the central axis A1.

The head portion 148 can include a first end surface 206 (FIG. 3) and a second end surface 208 (FIG. 3). The first end surface 206 and the second end surface 208 can be surfaces of the head portion 148 extending orthogonally to a proximal surface 204 of the head portion 148. The first end surface 206 and the second end surface 208 can be end surfaces of the semi-annular groove 202 adapted to limit rotation of the third body 114 and the second body 112 relative to the first body 110, such as based on a configuration of the lock projection 126. For example, if the lock projection 126 is configured to move between the locked position and the unlocked position when the third body 114 is rotated 180 degrees around the central axis A1, the first end surface 206 and the second end surface 208 can be circumferentially offset, or spaced radially apart, within the second body 112 by about 180 degrees. In some examples, the first end surface 206 can be located within the head portion 148 to contact the protrusion 200 when the ball 186 of the detent 184 is at least partially received within the first recess 194, and the second end surface 208 can be located within the head portion 148 to contact the protrusion 200 when the ball 186 of the detent 184 is received within the second recess 196.

The chuck 104 can include a first plug 210 (FIG. 2), a second plug 212 (FIG. 3), and a third plug 214 (FIG. 3). The first plug 210 and the second plug 212 can generally be pins, or otherwise cylindrical bodies, sized and shaped to contact and engage the second body 112 within the first recess 194 and the second recess 196, respectively, such as via a press-fit connection. In some examples, when the first plug 210 and the second plug 212 are received within the first recess 194 and the second recess 196, respectively, the first plug 210 and the second plug 212 can also contact the ball 186 to limit radial movement of the ball 186 into, or within, the first recess 194 and the second recess 196. The third plug 214 can generally be a pin, or otherwise a cylindrical body, sized and shaped to contact and engage the first body 110 within the second bearing aperture 171. In view of the above, the first plug 210, the second plug 212, and the third plug 214 can help to establish a fluid tight seal between the first body 110 and the second body 112 by preventing fluids from exiting the chuck 104 through the first recess 194, the second recess 196, or the second bearing aperture 171.

In some examples, the chuck 104 can include a chuck indicator 215 (FIG. 2) and the surgical impactor 102 can include an impactor indicator 217. The chuck indicator 215 can be located on, for example, but not limited to, the reference surface 180 or the distal surface 145 of the head portion 148 located generally parallel to, and axially offset from, the proximal surface 204. The impactor indicator 217 can be located on, for example, but not limited to, a guard 221 (FIG. 4B) of the surgical impactor 102. The chuck indicator 215 and the impactor indicator 217 can be adapted to provide a surgeon with, for example, but not limited to, an indication of a radial position or orientation of the lock projection 126, or in which direction to rotate the second body 112 and the third body 114 to move the lock projection 126 between the unlocked position and the locked position, or vice versa.

For example, the chuck indicator 215 and the impactor indicator 217 can each include similar, or otherwise corresponding symbols or graphics, directional indicators, or otherwise any visual or tactile element to indicate to a surgeon whether the lock projection 126 is in the locked position or the unlocked position, or in which direction to rotate the second body 112 and the third body 114 to move the lock projection 126 between the unlocked position and the locked position, or vice versa, based on a radial position or orientation of the chuck indicator 215 relative to the impactor indicator 217.

Figure 5:
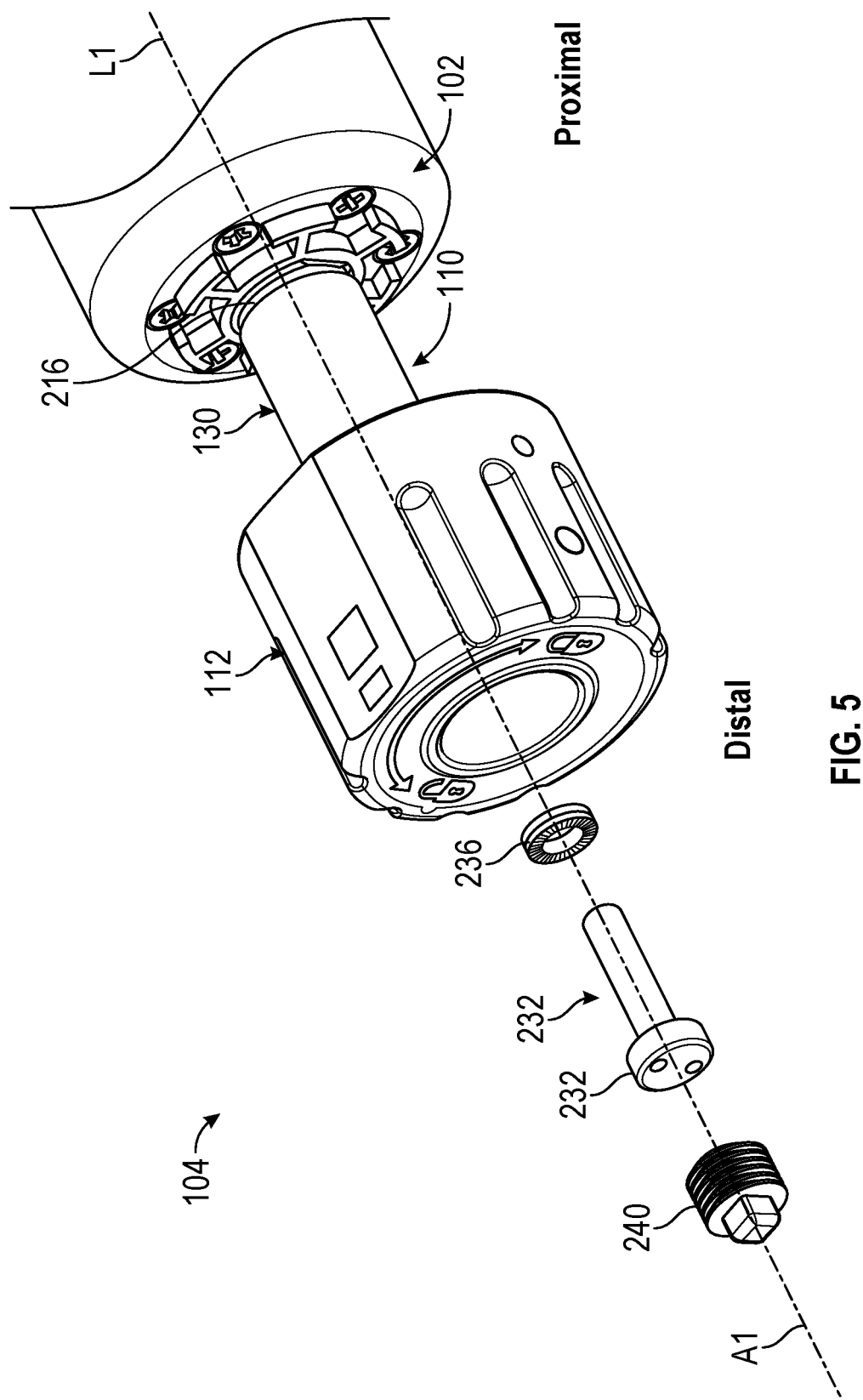
FIG. 5 illustrates a chuck partially inserted into a surgical impactor, in accordance with at least one example of the present application.

FIG. 5 illustrates a chuck 104 partially inserted into a surgical impactor 102, in accordance with at least one example of the present application. FIG. 6 illustrates a cross-section of a chuck 104 coupled to a surgical impactor 102, in accordance with at least one example of the present application. Also shown in FIGS. 5-6 are orientation indicators Proximal and Distal, a central axis A1, and a longitudinal axis L1. FIGS. 5-6 are discussed below concurrently. In some examples, such as shown in FIGS. 5-6, the proximal portion 130 of the first body 110 can define a second tapered surface 216. The second tapered surface 216 can form a frustoconical, conical, or outwardly tapered shape. During insertion of the proximal portion 130 into the surgical impactor 102, the second tapered surface 216 can contact, and slidingly engage, one or more surfaces of the surgical impactor 102 to help guide the proximal portion 130 proximally thereinto.

Subsequently, once the proximal portion 130 has at least partially entered the surgical impactor 102, the chuck 104 can be translated proximally toward the surgical impactor 102, such as until the distal portion 132 contacts the guard 221 (FIG. 6) thereby prevent further proximal movement of the bit 108 within the chuck 104. The surgical impactor 102 can include an impaction member 218. The impaction member 218 can generally be a component adapted to receive an axial impaction force, such as from a reciprocating assembly within the surgical impactor 102. The proximal portion 130 of the first body 110 can define an inner annular surface 220 (FIG. 6) and the impaction member 218 can define an outer annular surface 222 (FIG. 6).

The inner annular surface 220 and the outer annular surface 222 can form various three-dimensional shapes, such as a cylinder, a cuboidal prism, a triangular prism, a rectangular prism, a hexagonal prism, an octagonal prism, or the like. The inner annular surface 220 can be sized and shaped to be encompassed by, or otherwise be received within, the outer annular surface 222 of the impaction member 218. When the proximal portion 130 is received within the surgical impactor 102, the inner annular surface 220 can contact and engage the outer annular surface 222 to help concentrically center the first body 110, and thereby align the central axis A1, with respect to the longitudinal axis L1. The proximal portion 130 can further define a first surface 224 (FIG. 6), a second surface 226 (FIG. 6), and a fastener bore 228 (FIG. 6). The first surface 224 and the second surface 226 can extend parallel to, and be axially offset from, each another; and can extend orthogonally relative to the central axis A1 and the longitudinal axis L1.

The fastener bore 228 can be an aperture extending axially within the first body 110 between the first surface 224 and the second surface 226. The fastener bore 228 can extend concentrically with the first bit bore 134 (FIG. 6) and the longitudinal axis L1. The fastener bore 228 can define a diameter smaller than a diameter defined by the first portion 136 (FIG. 6) and the second portion 138 (FIG. 6) of the first bit bore 134. When the proximal portion 130 is received within the surgical impactor 102, the fastener bore 228 can be axially aligned with a coupling bore 230 (FIG. 6) defined by the impaction member 218 of the surgical impactor 102. The chuck 104 can include a fastener 232. The fastener 232 can be for example, but not limited to, a threaded fastener. The fastener 232 can be sized and shaped to extend axially through the fastener bore 228 into the coupling bore 230.

The fastener 232 can be adapted to removably couple the chuck 104 to the surgical impactor 102, such as by preventing, or otherwise limiting, proximal or distal movement of the proximal portion 130 along the longitudinal axis A1. For example, the fastener 232 can define a first plurality of threads 234 (FIG. 6) adapted to threadedly engage a second plurality of threads 235 (FIG. 6) defined by the impaction member 218 within the coupling bore 230. In some examples, such as shown in FIG. 6, an assembly tool 231 can be used to rotate the fastener 232, such as to cause the first plurality of threads 234 to rotate within the second plurality of threads 235, to draw the fastener 232 proximally toward the impaction member 218. The assembly tool 231 can generally be a tool or device sized and shaped to extend axially through the first bit bore 134 and the second bit bore 152 to access the fastener 232.

In some examples, the chuck 104 can also include a spacer 236. The spacer 236 can generally be a lock washer, a star washer, or various other types of anti-rotation washers. The spacer 236 can be sized and shaped to be received within the first portion 136 of the first bit bore 134. The spacer 236 can help to prevent the fastener 232 from rotating relative to the impaction member, such as by resisting vibration generated 218 during operation of the surgical impactor 102. For example, the spacer 236 can be compressively clamped between a head 238 of the fastener 232 and the second surface 226 of the first body 110 when the first plurality of threads 234 of the fastener 232 is fully engaged with the second plurality of threads 235 of the impaction member 218, such as shown in FIG. 6.

The chuck 104 can include a second sealing element 240 (FIGS. 4A & 5). The second sealing element 240 can be, but is not limited to, a polysiloxane, polymeric, or elastomeric plug or cylindrical body. The second sealing element 240 can be sized and shaped to reduce, or eliminate, the axial clearance between the second cylindrical surface 118 (FIG. 3) or the second cam surface 141 (FIG. 3) of the bit 108 when the bit 108 is received within the chuck 104. The second sealing element 240 can also be sized and shaped to engage the first body 110 within the first portion 136 of the first bit bore 134; and can be inserted into the first portion 136 of the first bit bore 134 once the spacer 236 and the fastener 232 are received therein.

The second sealing element 240 can thereby help to establish a fluid tight seal between the first body 110 and the surgical impactor 102 by preventing fluids from flowing into the surgical impactor 102 through the fastener bore 228; and limit proximal translation of the bit 108 within the chuck 104 by contacting the first body 110. The second sealing element 240 can also be sized and shaped to eliminate axial clearance between the second cylindrical surface 118 (FIG. 3) or the second cam surface 141 (FIG. 3) of the bit 108, when the bit 108 is fully inserted or received within the chuck 104. For example, the bit 108 can be fully inserted into the chuck 104 when the bit 108 contacts the second sealing element 240 to thereby prevent further proximal movement of the bit 108 within the chuck 104.

The chuck system 100 discussed with regard to any of FIGS. 1-6 above, such as including the bit 108 of the surgical instrument 106, the first body 110, the second body 112, the third body 114, or other components of the chuck 104 can be, in some examples, made from various plastics or composites, such as but not limited to, thermoplastic. In one example, one or more of the components listed above can be molded, or otherwise made from, PEEK (Polyether ether ketone) plastic. In other examples, the chuck system 100 discussed with regard to any of FIGS. 1-6 above, such as including the bit 108 of the surgical instrument 106, the first body 110, the second body 112, the third body 114, or other components of the chuck 104 can also be made from stainless steel, or other metals via machining or metallic molding.

FIG. 7 shows a plurality of surgical instruments 300 for use with the chuck 104 of FIGS. 1-6, in accordance with one or more examples of the present application. The plurality of surgical instruments 300 can be generally representative of a variety of surgical instruments adapted to utilize axial impaction forces to help perform one or more operations of a total hip arthroplasty. For example, the plurality of surgical instruments 300 can include, but is not limited to, a modular straight shell impactor 302, a femoral head impactor assembly 304, a curved shell impactor assembly 306, a bullet tip stem driver 308, a liner remover adapter 310, a striker plate adapter 312, a straight shell impactor 314, a straight broach adapter (anterior) 316, a straight broach adapter (posterior) 318.

Figure 8:
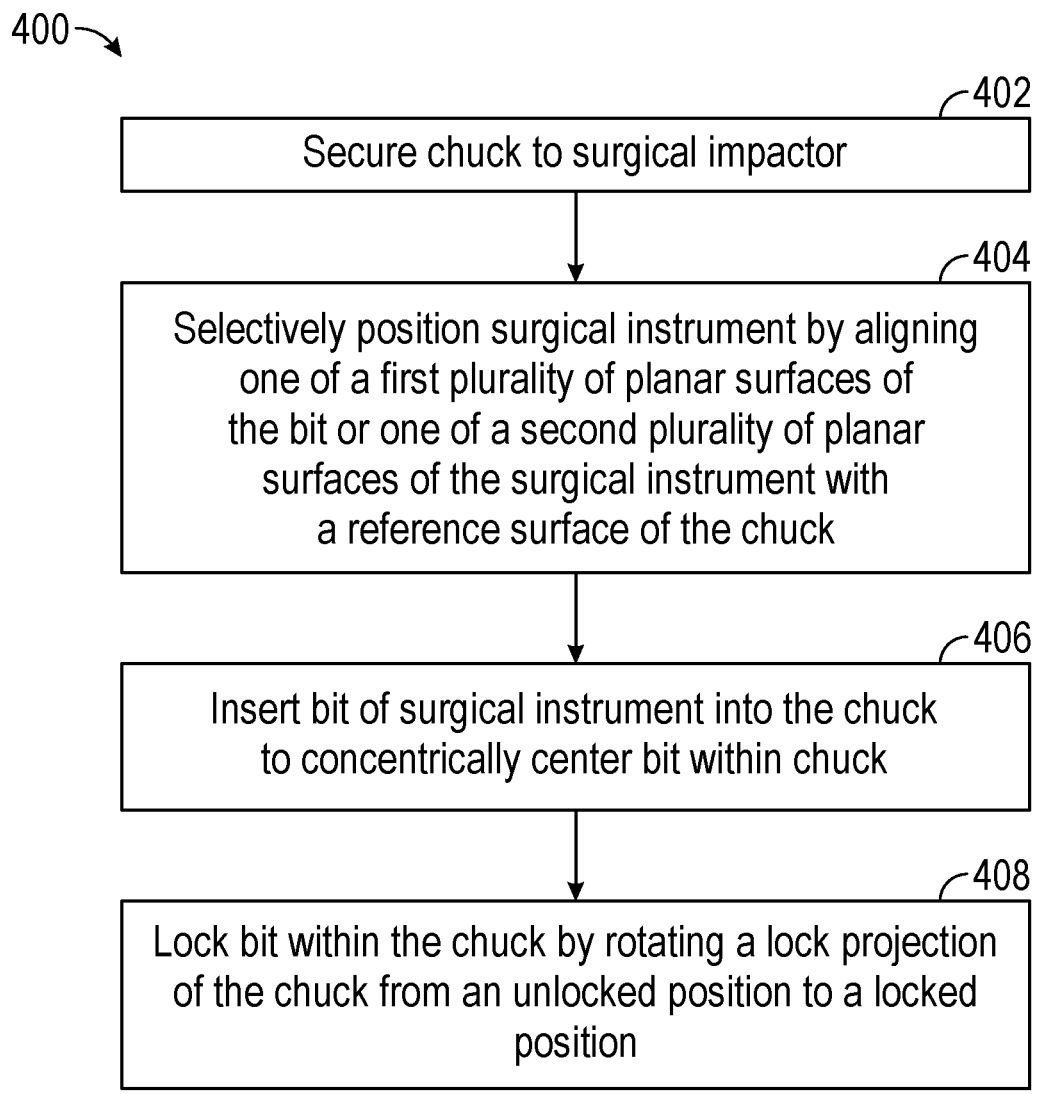
FIG. 8 illustrates a method of operatively coupling a surgical instrument to a surgical impactor, in accordance with at least one example of the present application.

FIG. 8 illustrates a method 400 of operatively coupling a surgical instrument to a surgical impactor, in accordance with at least one example of the present application. The steps or operations of the method 400 are illustrated in a particular order for convenience and clarity; many of the discussed operations can be performed by multiple different actors, devices, or systems. It is understood that subsets of the operations discussed in the method 400 can be attributable to a single actor, device, or system and can be considered a separate standalone process or method.

The method 400 can include operation 402. The operation 402 can include securing a chuck to the surgical impactor. For example, a user can insert a proximal portion of a first body of the chuck into the surgical impactor, such as until a distal portion of the first body contacts the surgical impactor; and the user can insert a fastener through a fastener bore in the first body to threadedly engage an impaction member of the surgical impactor. The user can then rotate the fastener, such as to cause a first plurality of threads of the fastener to rotate within a second plurality of coupling threads of the impaction member to thereby prevent axial movement of the chuck relative to the surgical impactor.

The method 400 can optionally include operation 404. The operation 404 can include selectively positioning the surgical instrument with respect to the chuck by aligning one of a first plurality of planar surfaces of the bit or one of a second plurality of planar surfaces of the surgical instrument with a reference surface of the chuck. For example, a surgeon can first determine a desired orientation, relative to a central axis of the chuck or a longitudinal axis of the surgical impactor, which is suited to help the surgical instrument perform one or more operations of a total hip arthroplasty; and select one planar surface of the first plurality of planar surfaces or the second plurality of planar surfaces that is most closely aligned with, or mostly corresponds to, the desired orientation of the surgical instrument. Subsequently, the surgeon can then align the selected planar surface with the reference to ensure that the selected planar surface contacts and slides along a cross-pin located within the chuck during insertion of the bit of the surgical instrument into the chuck.

The method 400 can include operation 406. The operation 406 can include inserting a bit of the surgical instrument into the chuck to concentrically center the bit within the chuck. For example, the user can translate the bit of the surgical instrument proximally into the chuck, such as along a central axis or a longitudinal axis, until the bit passes axially through a second bit bore and is received within a first bit bore of the chuck. In some examples, the operation 406 can include slidingly engaging a first cylindrical surface of the chuck with a second cylindrical surface of the bit to concentrically center the bit within the chuck. For example, a surgeon can translate the bit of the surgical instrument proximally into the chuck to cause the first cylindrical surface to slide along the second cylindrical surface to, in turn, guide the bit into axial alignment with a central axis of the chuck or a longitudinal axis of the surgical impactor.

In some examples, the operation 406 can also include engaging a third cylindrical surface of the chuck with a plurality of contacting surfaces of the bit to concentrically center the bit within the chuck. For example, a surgeon can translate the bit of the surgical instrument proximally into the chuck to cause the plurality of contacting surfaces to slide along the third cylindrical surface to, in turn, guide a first cylindrical surface of the bit into axial alignment with a central axis of the chuck or a longitudinal axis of the surgical impactor.

The method 400 can include operation 408. The operation 408 can include locking the bit within the chuck by rotating a lock projection of the chuck from an unlocked position to a locked position. For example, once the bit is received within the chuck, a surgeon can rotate a third body defining the lock projection between about 90 degrees and about 360 degrees around a central axis of the chuck to cause a proximal end surface of the lock projection to contact and engage a distal end surface of the bit, in turn, to prevent distal translation of the bit relative to the central axis. In some examples, the operation 408 can include rotating the lock projection about 180 degrees relative to a central axis defined by the chuck. In some examples, the operation 408 can include aligning a chuck indicator with an impactor indicator. For example, the surgeon can first view the chuck indicator and the impactor indicator to receive an indication of whether the lock projection is in the locked position or the unlocked position, or in which direction, a radial distance, a third body defining the lock projection should be rotated to move the lock projection between the unlocked position and the locked position, or vice versa.

Figure 9A:
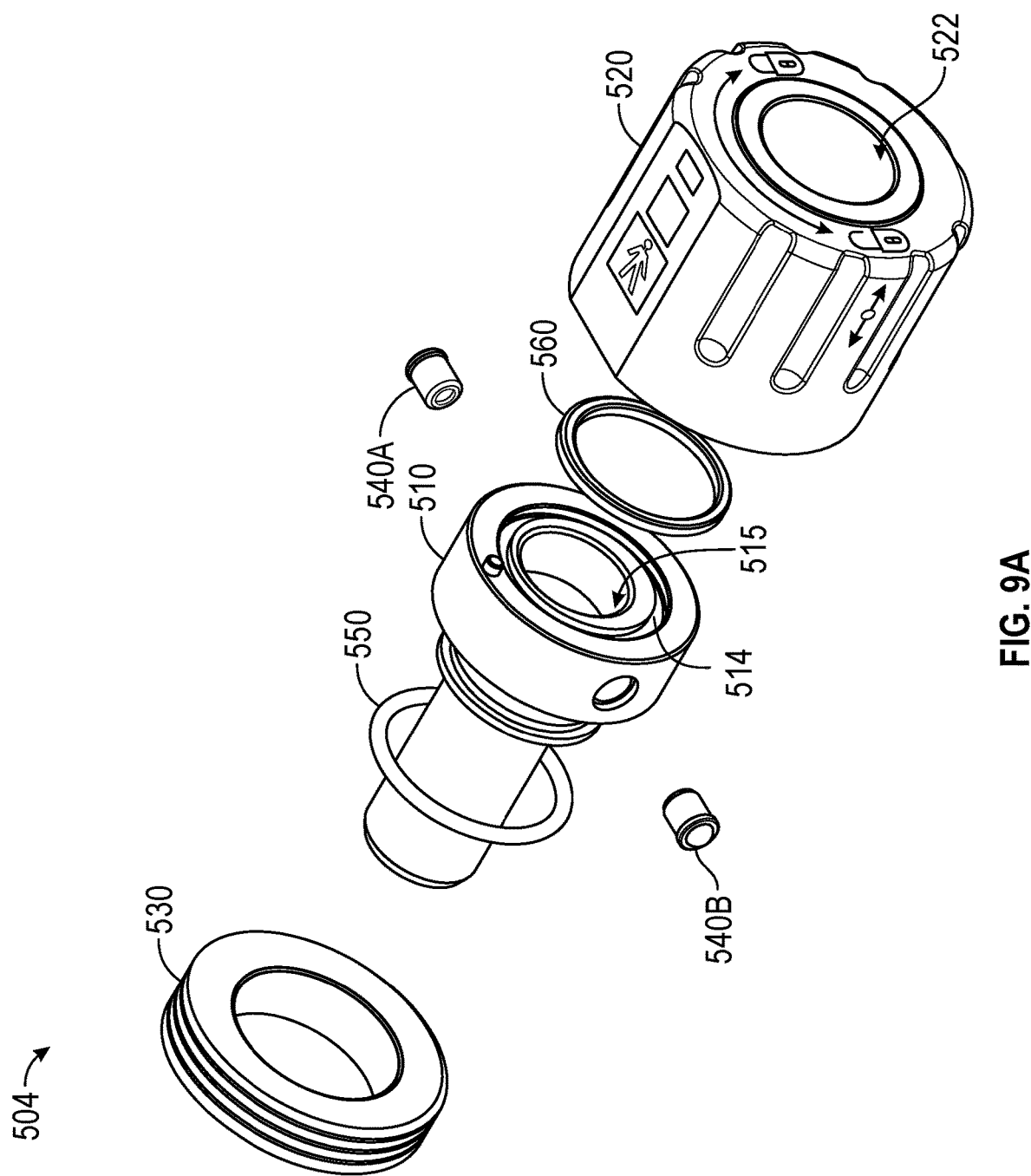
FIG. 9A illustrates an exploded view of a chuck system, in accordance with at least one example of the present application.
Figure 9B:
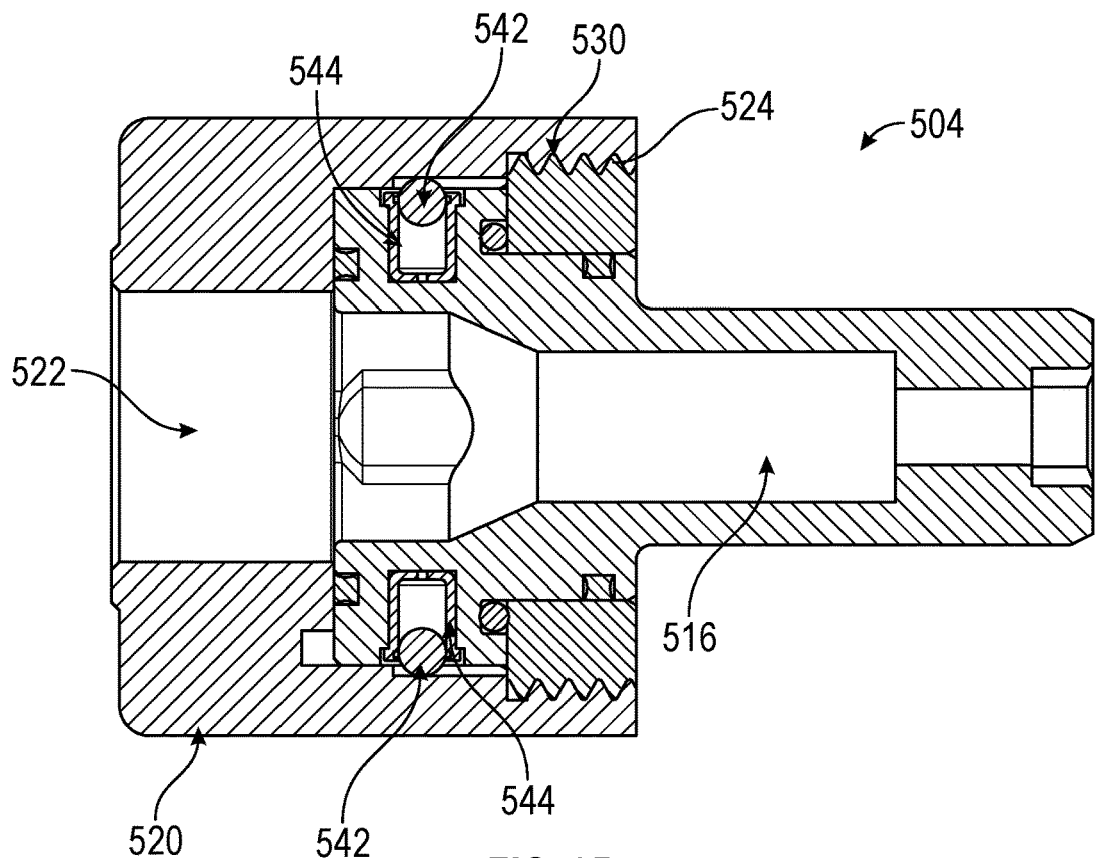
FIG. 9B illustrates a cross-section of a chuck system, in accordance with at least one example of the present application.
Figure 9C:
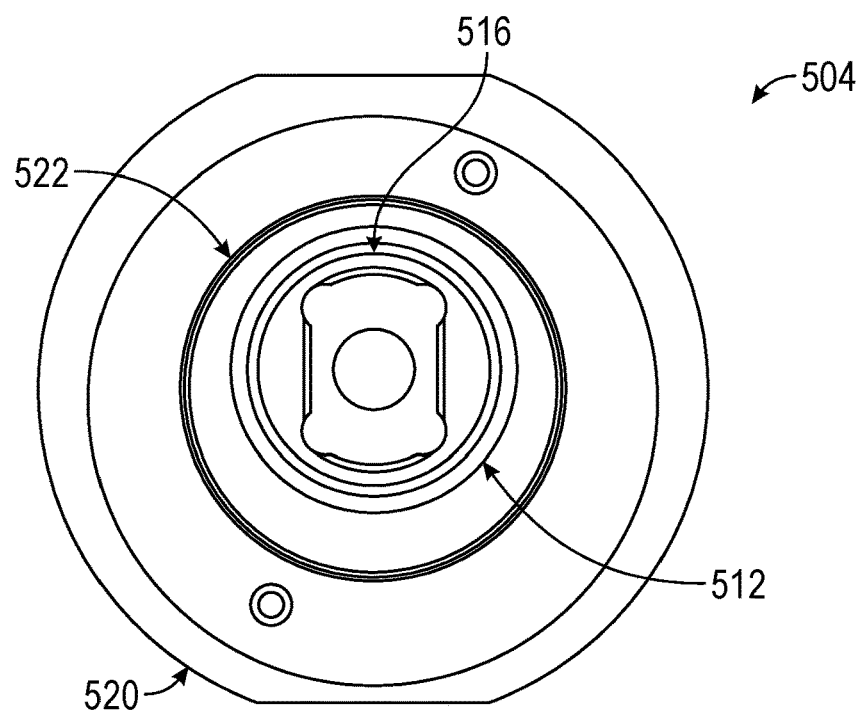
FIG. 9C illustrates a second cross-section of a chuck system, in accordance with at least one example of the present application.

FIG. 9A illustrates an exploded view of a chuck system, in accordance with at least one example of the present application. In this example, the chuck 504 includes structures such as a chuck body 510, a lock knob 520, a rear threaded cap 530, ball plungers 540A, 540B (collectively referred to as ball plungers 540), o-ring 550, and forward bearing 560. FIG. 9B illustrates a cross-section of the chuck 504 while FIG. 9C illustrates a second cross-section of chuck 504. The chuck 504 is discussed below in references to FIGS. 9A-9C.

The chuck body 510 is adapted to be secured into the surgical impactor 102 in a manner similar to the chuck 104 discussed above. Prior to insertion into the surgical impactor 102, the lock knob 520 is secured over the chuck body 510 by threading the proximal end into the rear threaded cap 530. The o-ring 550 is positioned between the rear threaded cap 530 and a proximal face of the chuck body 510 to seal the internal part of the chuck 504. The forward bearing 560 sits in a groove 514 in the distal face of the chuck body 510. In an example, the forward bearing 560 can be a solid bearing or a lubricated o-ring to allow for rotation of the lock knob 520 relative to the chuck body 510. Prior to assembly of the lock knob 520 with the chuck body 510, the ball plungers 540 are inserted into opposing sides of the chuck body 510. The ball plungers 540 interact with recesses within the lock knob 520 to provide detents in the lock and unlock positions, which are 180 degrees apart in this example.

In this example, the chuck 504 is a refinement of chuck 104 is discussed in reference to at least FIGS. 1A-6. Other than the changes illustrated in FIGS. 9A-9C and discussed below, the chuck 504 retains the structures of chuck 104. For example, lock knob 520 contains structures comparable to second body 112 and third body 114. However, the lock knob 520 is formed as a single structure effectively integrating the second body 112 and the third body 114. The lock knob 520 includes structures including, but not limited to, a lock projection 126 and a first face 119 for engaging portions of the bit 108. The lock knob 520 also includes an instrument bore 522 to receive a bit, such as bit 108. The lock knob 520 also includes a distal internal threaded surface 524 adapted to engage the rear threaded cap 530.

Chuck body 510 is similar in structure to first body 110 in particular all of the structures internal to first body 110 that engage with the bit 108 are replicated within chuck body 510. For example, the first cylindrical surface 116 is replicated within chuck body 510 as the first cylindrical surface 516 as well as the third cylindrical surface 125 which is replicated within chuck body 510 as the third cylindrical surface 515. For the sake of clarity, the chuck 504 does not specifically identify all of the common structures from chuck 104 in order to emphasize the points of difference. The chuck body 510 only differs from the first body 110 in certain exterior features, such as the cylindrical groove 514 on the distal face to receive the forward bearing 560.

The ball plungers 540 can be configured similar to the detent 184 first discussed in reference to FIG. 2. In this example, the ball plungers 540 can include insert 544 and ball 542. The ball plungers 540 can also include a spring to bias the ball 542 outward to engage recesses within the lock knob 520.

In operation, the chuck 504 receives a bit, such as bit 108, into the instrument bore 522 with the lock know 520 in the unlocked position. Once the bit is firmly seated within the chuck body 510, the lock knob 520 can be turned 180 degrees clockwise until the ball plungers 540 are received within the recesses within the lock knob 520. As discussed in reference to chuck 104, the lock knob 520 includes an eccentric cam structure to engage the bit and secure it within the chuck body 510.

The foregoing systems and devices, etc. are merely illustrative of the components, interconnections, communications, functions, etc. that can be employed in carrying out examples in accordance with this disclosure. Different types and combinations of sensor or other portable electronics devices, computers including clients and servers, implants, and other systems and devices can be employed in examples according to this disclosure.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure.

This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

Notes and Examples

The following, non-limiting examples, detail certain aspects of the present subject matter to solve the challenges and provide the benefits discussed herein, among others.

Example 1 is a chuck for a powered surgical impactor, the chuck comprising: a first body including: a proximal portion insertable into the powered surgical impactor to locate the first body with respect to the powered surgical impactor; and a distal portion defining a first bit bore; a second body adapted to receive the distal portion of the first body; a third body receivable at least partially within the second body, the third body defining a second bit bore extending through the third body; wherein: the third body defines a lock projection; the third body and the second body are adapted to engage each other to prevent relative rotation therebetween; and the third body and the second body are adapted to rotate relative to the first body to move the lock projection between an unlocked position, in which the lock projection is located to allow insertion of a surgical instrument into the chuck, and a locked position, in which the lock projection is located to prevent removal of the surgical instrument from the chuck.

In Example 2, the subject matter of Example 1 includes, wherein: the lock projection extends radially inward into the second bit bore; the surgical instrument includes a bit insertable into the chuck to operatively couple the surgical instrument to the powered surgical impactor, the bit adapted to engage the first body within the first bit bore to concentrically center the bit within the chuck; in the locked position, the lock projection of the third body is located to prevent removal of the bit from the chuck; and in the unlocked position, the lock projection of the third body is located to allow removal of the bit from the chuck.

In Example 3, the subject matter of Example 2 includes, wherein: the first body defines a first cylindrical surface forming a portion of the first bit bore; and the bit defines a second cylindrical surface, the second cylindrical surface adapted to engage the first cylindrical surface to concentrically center the bit within the chuck.

In Example 4, the subject matter of Example 3 includes, wherein: the first bit bore includes a first portion and a second portion, the first portion defining a diameter less than a diameter defined by the second portion, wherein a first tapered surface extends between the first portion and the second portion; and the bit includes a first cam surface extending between the second cylindrical surface and a fourth cylindrical surface of the bit, the first cam surface adapted to correspond to the first tapered surface.

In Example 5, the subject matter of Examples 3-4 includes, wherein: the first body defines a third cylindrical surface located distally to the first cylindrical surface; and the bit defines a plurality of contacting surfaces located distally to the second cylindrical surface, the plurality of contacting surfaces forming an annular arrangement and adapted to engage the third cylindrical surface of the first body to concentrically center the bit within the chuck.

In Example 6, the subject matter of Example 5 includes, wherein: the bit defines a first plurality of planar surfaces forming an annular arrangement, wherein the chuck is adapted to engage the first plurality of planar surfaces to prevent rotation of the bit within the chuck; and each contacting surface of the plurality of contacting surfaces radially spaces each planar surface of the plurality of planar surfaces apart from one another.

In Example 7, the subject matter of Example 6 includes, wherein the chuck includes a cross-pin extending transversely through the first body and orthogonally across the first bit bore within the first portion, the cross-pin located to engage one of the first plurality of planar surfaces to prevent rotation of the bit within the chuck.

In Example 8, the subject matter of Example 7 includes, wherein: the surgical instrument includes a second plurality of planar surfaces forming an annular arrangement, the second plurality of planar surfaces located externally to the chuck when the bit is received within the chuck, wherein each planar surface of the second plurality of planar surfaces corresponds to an orientation of one planar surface of the first plurality of planar surfaces; and the second body defines a reference surface extending parallel to the cross-pin when the lock projection is in the unlocked position.

In Example 9, the subject matter of Examples 1-8 includes, wherein: the first body defines a first annular groove located distally to the second portion of the first bit bore; the third body defines a second annular groove; and the chuck includes a plurality of ball bearings adapted to be concurrently received within the first annular groove and the second annular groove, the plurality of ball bearings adapted to rotatably support the third body and the second body with respect to the first body.

In Example 10, the subject matter of Example 9 includes, wherein: the first body defines an outer surface and a third annular groove extending radially inward into the outer surface; the second body defines an inner surface; and the chuck includes a first sealing element adapted to be received within the third annular groove of the first body, the first sealing element adapted to engage the inner surface of the second body to establish a fluid tight seal between the first body and the second body.

In Example 11, the subject matter of Example 10 includes, wherein the chuck includes a second sealing element located within the first body, the second sealing element adapted to establish a fluid tight seal between the first body and the powered surgical impactor and limit proximal translation of the bit within the chuck.

Example 12 is a chuck system for a powered surgical impactor, the chuck system comprising: a chuck including: a first body including: a proximal portion insertable into the powered surgical impactor to locate the first body with respect to the powered surgical impactor; a distal portion defining a first bit bore, wherein the first body defines a first cylindrical surface forming a portion of the first bit bore; a second body adapted to receive the distal portion of the first body; a third body receivable at least partially within the second body, the third body defining a second bit bore extending through the third body; wherein: the third body defines a lock projection extending radially inward into the second bit bore, the lock projection forming a semi-annular profile; the third body and the second body are adapted to engage each other to prevent relative rotation therebetween; the third body and the second body are adapted to rotate relative to the first body to move the lock projection between a locked position and an unlocked position; and a surgical instrument including: a bit insertable into the chuck to operatively couple the surgical instrument to the powered surgical impactor.

In Example 13, the subject matter of Example 12 includes, wherein: the bit defines a second cylindrical surface adapted to engage the first cylindrical surface of the first body to concentrically center the bit within the chuck, wherein: in the unlocked position, the lock projection of the third body is located to allow insertion of the bit into the chuck; and in the locked position, the lock projection of the third body is located to prevent removal of the bit from the chuck.

In Example 14, the subject matter of Example 13 includes, wherein: the first bit bore and the second bit bore collectively define a central axis; the lock projection defines a proximal end surface extending substantially orthogonally to the central axis; and the bit defines a distal end surface extending radially outward from the bit, the distal end surface extending substantially orthogonally to the central axis when the bit is received within the chuck, wherein the proximal end surface is located to engage the distal end surface to limit distal translation of the bit within the chuck when the lock projection is in the locked position.

In Example 15, the subject matter of Example 14 includes, wherein: the third body includes: a head portion adapted to engage the second body to support the third body within the second body and locate the second bit bore of the third body with respect to the first bit bore of the first body and the central axis; and a body portion extending proximally from the head portion, the body portion defining a second annular groove; the first body defines a first annular groove located distally to a second portion of the first bit bore; and the chuck includes a plurality of ball bearings adapted to be concurrently received within the first annular groove and the second annular groove, the plurality of ball bearings adapted to rotatably support the third body and the second body with respect to the first body.

In Example 16, the subject matter of Example 15 includes, wherein: the first body defines a fastener bore located proximally to, and extending concentrically with, the first bit bore; and the chuck system includes a fastener adapted to extend axially though the fastener bore to removably couple the chuck to the powered surgical impactor.

In Example 17, the subject matter of Example 16 includes, wherein: the powered surgical impactor includes an impaction member including an outer annular surface; and the first body defines an inner annular surface located proximally to the fastener bore, wherein the inner annular surface is adapted to engage the outer annular surface to concentrically center the first body with respect to the powered surgical impactor.

In Example 18, the subject matter of Example 17 includes, wherein the chuck includes: a first sealing element adapted to be received within a third annular groove of the first body, the first sealing element adapted to engage an inner surface of the second body to establish a fluid tight seal between the first body and the second body; and a second sealing element located within the first body, the second sealing element adapted to establish a fluid tight seal between the first body and the powered surgical impactor and limit proximal translation of the bit within the chuck.

In Example 19, the subject matter of Example 18 includes, wherein: the chuck system includes a detent received within the first body, wherein a ball of the detent is adapted to extends radially outward beyond an outer surface of the first body; and the second body defines a first recess and a second recess, the first recess located to receive the ball of the detent when the lock projection of the third body is in the unlocked position and the second recess located to receive the ball of the detent when the lock projection of the third body is in the locked position.

In Example 20, the subject matter of Example 19 includes, wherein: the first body defines a protrusion located distally to the first annular groove, the protrusion extending parallel to, and laterally offset from, the central axis; and the head portion of the third body defines a first end surface and a second end surface, wherein the first end surface is located to contact the protrusion when the ball of the detent is received within the first recess and the second end surface is located to contact the protrusion when the ball of the detent is received within the second recess.

Example 21 is a method of operatively coupling a surgical instrument to a surgical impactor, the method comprising: securing a chuck to the surgical impactor; inserting a bit of the surgical instrument into the chuck to concentrically center the bit within the chuck; and locking the bit within the chuck by rotating a lock projection of the chuck from an unlocked position to a locked position.

In Example 22, the subject matter of Example 21 includes, wherein inserting the bit of the surgical instrument into the chuck includes engaging a first cylindrical surface of the chuck with a second cylindrical surface of the bit to concentrically center the bit within the chuck.

In Example 23, the subject matter of Example 22 includes, wherein inserting the bit of the surgical instrument into the chuck includes engaging a third cylindrical surface of the chuck with a plurality of contacting surfaces of the bit to concentrically center the bit within the chuck.

In Example 24, the subject matter of Examples 21-23 includes, degrees relative to a central axis defined by the chuck.

In Example 25, the subject matter of Example 24 includes, wherein locking the bit within the chuck by rotating the lock projection of the chuck from the unlocked position to the locked position includes aligning a chuck indicator with an impactor indicator.

In Example 26, the subject matter of Examples 21-25 includes, wherein the method includes selectively positioning the surgical instrument by aligning one of a first plurality of planar surfaces of the bit or one of a second plurality of planar surfaces of the surgical instrument with a reference surface of the chuck.

Example 27 is at least one machine-readable medium including instructions that, when executed by processing circuitry, cause the processing circuitry to perform operations to implement of any of Examples 1-26.

Example 28 is an apparatus comprising means to implement of any of Examples 1-26.

Example 29 is a system to implement of any of Examples 1-26.

Example 30 is a method to implement of any of Examples 1-26.

What is claimed is:

1. A chuck for a powered surgical impactor, the chuck comprising:
   a first body including:
      a proximal portion insertable into the powered surgical impactor to locate the first body with respect to the powered surgical impactor; and
      a distal portion defining a first bit bore;
   a second body adapted to receive the distal portion of the first body;
   a third body receivable at least partially within the second body, the third body defining a second bit bore extending through the third body; wherein:
      the third body defines a lock projection;
      the third body and the second body are adapted to engage each other to prevent relative rotation therebetween; and
      the third body and the second body are adapted to rotate relative to the first body to move the lock projection between an unlocked position, in which the lock projection is located to allow insertion of a surgical instrument into the chuck, and a locked position, in which the lock projection is located to prevent removal of the surgical instrument from the chuck.

2. The chuck of claim 1, wherein:
   the lock projection extends radially inward into the second bit bore;
   the surgical instrument includes a bit insertable into the chuck to operatively couple the surgical instrument to the powered surgical impactor, the bit adapted to engage the first body within the first bit bore to concentrically center the bit within the chuck;
   in the locked position, the lock projection of the third body is located to prevent removal of the bit from the chuck; and
   in the unlocked position, the lock projection of the third body is located to allow removal of the bit from the chuck.

3. The chuck of claim 2, wherein:
   the first body defines a first cylindrical surface forming a portion of the first bit bore; and
   the bit defines a second cylindrical surface, the second cylindrical surface adapted to engage the first cylindrical surface to concentrically center the bit within the chuck.

4. The chuck of claim 3, wherein:
   the first bit bore includes a first portion and a second portion, the first portion defining a diameter less than a diameter defined by the second portion, wherein a first tapered surface extends between the first portion and the second portion; and
   the bit includes a first cam surface extending between the second cylindrical surface and a fourth cylindrical surface of the bit, the first cam surface adapted to correspond to the first tapered surface.

5. The chuck of claim 3, wherein:
   the first body defines a third cylindrical surface located distally to the first cylindrical surface; and
   the bit defines a plurality of contacting surfaces located distally to the second cylindrical surface, the plurality of contacting surfaces forming an annular arrangement and adapted to engage the third cylindrical surface of the first body to concentrically center the bit within the chuck.

6. The chuck of claim 5, wherein:
   the bit defines a first plurality of planar surfaces forming an annular arrangement, wherein the chuck is adapted to engage the first plurality of planar surfaces to prevent rotation of the bit within the chuck; and
   each contacting surface of the plurality of contacting surfaces radially spaces each planar surface of the plurality of planar surfaces apart from one another.

7. The chuck of claim 6, wherein the chuck includes a cross-pin extending transversely through the first body and orthogonally across the first bit bore within the first portion, the cross-pin located to engage one of the first plurality of planar surfaces to prevent rotation of the bit within the chuck.

8. The chuck of claim 7, wherein:
   the surgical instrument includes a second plurality of planar surfaces forming an annular arrangement, the second plurality of planar surfaces located externally to the chuck when the bit is received within the chuck, wherein each planar surface of the second plurality of planar surfaces corresponds to an orientation of one planar surface of the first plurality of planar surfaces; and
   the second body defines a reference surface extending parallel to the cross-pin when the lock projection is in the unlocked position.

9. The chuck of claim 1, wherein:
   the first body defines a first annular groove located distally to the second portion of the first bit bore;
   the third body defines a second annular groove; and
   the chuck includes a plurality of ball bearings adapted to be concurrently received within the first annular groove and the second annular groove, the plurality of ball bearings adapted to rotatably support the third body and the second body with respect to the first body.

10. The chuck of claim 9, wherein:
the first body defines an outer surface and a third annular groove extending radially inward into the outer surface;
the second body defines an inner surface; and
the chuck includes a first sealing element adapted to be received within the third annular groove of the first body, the first sealing element adapted to engage the inner surface of the second body to establish a fluid tight seal between the first body and the second body.

11. The chuck of claim 10, wherein the chuck includes a second sealing element located within the first body, the second sealing element adapted to establish a fluid tight seal between the first body and the powered surgical impactor and limit proximal translation of the bit within the chuck.

12. A chuck system for a powered surgical impactor, the chuck system comprising:
a chuck including:
a first body including:
a proximal portion insertable into the powered surgical impactor to locate the first body with respect to the powered surgical impactor;
a distal portion defining a first bit bore, wherein the first body defines a first cylindrical surface forming a portion of the first bit bore;
a second body adapted to receive the distal portion of the first body;
a third body receivable at least partially within the second body, the third body defining a second bit bore extending through the third body; wherein:
the third body defines a lock projection extending radially inward into the second bit bore, the lock projection forming a semi-annular profile;
the third body and the second body are adapted to engage each other to prevent relative rotation therebetween;
the third body and the second body are adapted to rotate relative to the first body to move the lock projection between a locked position and an unlocked position; and
a surgical instrument including:
a bit insertable into the chuck to operatively couple the surgical instrument to the powered surgical impactor.

13. The chuck system of claim 12, wherein:
the bit defines a second cylindrical surface adapted to engage the first cylindrical surface of the first body to concentrically center the bit within the chuck, wherein:
in the unlocked position, the lock projection of the third body is located to allow insertion of the bit into the chuck; and
in the locked position, the lock projection of the third body is located to prevent removal of the bit from the chuck.

14. The chuck system of claim 13, wherein:
the first bit bore and the second bit bore collectively define a central axis;
the lock projection defines a proximal end surface extending substantially orthogonally to the central axis; and
the bit defines a distal end surface extending radially outward from the bit, the distal end surface extending substantially orthogonally to the central axis when the bit is received within the chuck, wherein the proximal end surface is located to engage the distal end surface to limit distal translation of the bit within the chuck when the lock projection is in the locked position.

15. The chuck system of claim 14, wherein:
the third body includes:
a head portion adapted to engage the second body to support the third body within the second body and locate the second bit bore of the third body with respect to the first bit bore of the first body and the central axis; and
a body portion extending proximally from the head portion, the body portion defining a second annular groove;
the first body defines a first annular groove located distally to a second portion of the first bit bore; and
the chuck includes a plurality of ball bearings adapted to be concurrently received within the first annular groove and the second annular groove, the plurality of ball bearings adapted to rotatably support the third body and the second body with respect to the first body.

16. The chuck system of claim 15, wherein:
the first body defines a fastener bore located proximally to, and extending concentrically with, the first bit bore; and
the chuck system includes a fastener adapted to extend axially though the fastener bore to removably couple the chuck to the powered surgical impactor.

17. The chuck system of claim 16, wherein:
the powered surgical impactor includes an impaction member including an outer annular surface; and
the first body defines an inner annular surface located proximally to the fastener bore, wherein the inner annular surface is adapted to engage the outer annular surface to concentrically center the first body with respect to the powered surgical impactor.

18. The chuck system of claim 17, wherein the chuck includes:
a first sealing element adapted to be received within a third annular groove of the first body, the first sealing element adapted to engage an inner surface of the second body to establish a fluid tight seal between the first body and the second body; and
a second sealing element located within the first body, the second sealing element adapted to establish a fluid tight seal between the first body and the powered surgical impactor and limit proximal translation of the bit within the chuck.

19. The chuck system of claim 18, wherein:
the chuck system includes a detent received within the first body, wherein a ball of the detent is adapted to extends radially outward beyond an outer surface of the first body; and
the second body defines a first recess and a second recess, the first recess located to receive the ball of the detent when the lock projection of the third body is in the unlocked position and the second recess located to receive the ball of the detent when the lock projection of the third body is in the locked position.

20. The chuck system of claim 19, wherein:
the first body defines a protrusion located distally to the first annular groove, the protrusion extending parallel to, and laterally offset from, the central axis; and
the head portion of the third body defines a first end surface and a second end surface, wherein the first end surface is located to contact the protrusion when the ball of the detent is received within the first recess and the second end surface is located to contact the protrusion when the ball of the detent is received within the second recess.

* * * * *